(12) United States Patent
Huang et al.

(10) Patent No.: US 12,193,085 B2
(45) Date of Patent: Jan. 7, 2025

(54) COMMUNICATION METHOD AND RELATED PRODUCT TO ESTABLISH A LINK BETWEEN TWO COMMUNICATION DEVICES

(71) Applicant: HUAWEI TECHNOLOGIES CO., LTD., Guangdong (CN)

(72) Inventors: Wenqian Huang, Shenzhen (CN); Yifan Xue, Beijing (CN); Chuting Yao, Beijing (CN); Jian Wang, Beijing (CN); Haibo Xu, Beijing (CN); Zhou Wang, Shenzhen (CN); Yifan Du, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 323 days.

(21) Appl. No.: 17/764,815

(22) PCT Filed: Sep. 18, 2020

(86) PCT No.: PCT/CN2020/116041
§ 371 (c)(1),
(2) Date: Mar. 29, 2022

(87) PCT Pub. No.: WO2021/063192
PCT Pub. Date: Apr. 8, 2021

(65) Prior Publication Data
US 2022/0338282 A1 Oct. 20, 2022

(30) Foreign Application Priority Data
Sep. 30, 2019 (CN) .......................... 201910948196.X

(51) Int. Cl.
*H04W 72/04* (2023.01)
*H04L 1/00* (2006.01)
(Continued)

(52) U.S. Cl.
CPC ........... *H04W 76/14* (2018.02); *H04L 1/0038* (2013.01); *H04L 1/1896* (2013.01); *H04W 72/02* (2013.01); *H04W 72/0453* (2013.01)

(58) Field of Classification Search
CPC . H04W 76/14; H04W 72/02; H04W 72/0453; H04W 72/40; H04W 4/40;
(Continued)

(56) References Cited

U.S. PATENT DOCUMENTS

2017/0064693 A1* 3/2017 Kim .................. H04W 4/70
2019/0124673 A1 4/2019 Seo et al.
(Continued)

FOREIGN PATENT DOCUMENTS

CN 107995605 A 5/2018
CN 108886786 A 11/2018
(Continued)

OTHER PUBLICATIONS

R1-1808605, Zte, Discussion on NR Sidelink Physical resource pool allocation, 3GPP Tsg Ran WG1 Meeting #94, Gothenburg, Sweden, Aug. 20-24, 2018, 5 pages.
(Continued)

*Primary Examiner* — Maharishi V Khirodhar
(74) *Attorney, Agent, or Firm* — WOMBLE BOND DICKINSON (US) LLP

(57) ABSTRACT

This application discloses a communication method and a related product. The method includes: sending a first message, where the first message includes a first link configuration parameter, and the first link configuration parameter is used to establish a first link; and receiving a first acknowledgement message sent by a second user terminal, where the first acknowledgement message is used to indicate that the second user terminal completes establishment of the first link to the first user terminal.

13 Claims, 11 Drawing Sheets

(51) Int. Cl.
| | |
|---|---|
| *H04L 1/1867* | (2023.01) |
| *H04W 72/02* | (2009.01) |
| *H04W 72/0453* | (2023.01) |
| *H04W 76/00* | (2018.01) |
| *H04W 76/14* | (2018.01) |
| *H04W 88/08* | (2009.01) |

(58) Field of Classification Search
CPC .... H04W 24/02; H04L 1/0038; H04L 1/1896; H04L 1/1893; H04L 1/1607
USPC .......................................................... 370/329
See application file for complete search history.

(56) References Cited

U.S. PATENT DOCUMENTS

| | | | |
|---|---|---|---|
| 2019/0260485 | A1 | 8/2019 | Byun et al. |
| 2020/0029318 | A1* | 1/2020 | Guo ....................... H04W 76/14 |
| 2020/0260512 | A1* | 8/2020 | Cheng ................... H04W 76/27 |
| 2020/0367221 | A1* | 11/2020 | Maaref ................. H04W 72/52 |
| 2021/0250957 | A1* | 8/2021 | Roth-Mandut ..... H04W 72/543 |
| 2021/0298044 | A1* | 9/2021 | Cheng ................... H04W 72/02 |
| 2022/0150730 | A1* | 5/2022 | Freda ....................... H04L 1/188 |

FOREIGN PATENT DOCUMENTS

| | | | |
|---|---|---|---|
| CN | 108923894 | A | 11/2018 |
| CN | 108988983 | A | 12/2018 |
| CN | 109588057 | A | 4/2019 |
| CN | 109963265 | A | 7/2019 |
| EP | 3454477 | A1 | 3/2019 |
| WO | WO-2017099833 | A1 * | 6/2017 |

OTHER PUBLICATIONS

Bgpp Ts 24.334 V15.2.0 (2018-09), 3rd Generation Partnership Project; Technical Specification Group Core Network and Terminals; Proximity-services (ProSe) User Equipment (UE) to Prose function protocol aspects; Stage 3 (Release 15), 264 page.
3GPP Ts 36.300 V15.7.0 (2019-09), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15), 365 pages.
R2-1816517, Huawei et al., Potential AS layer impacts on SL connection setup and configuration in unicast, 3GPP Tsg-Ran WG2 # 104, Spokane, USA, Nov. 12-16, 2018, 4 pages.
3GPP Ts 23.303 V15.1.0(2018-06), 3rd Generation Partnership Project; Technical Specification Group Services and System Aspects; Proximity-based services (Prose); Stage 2 (Release 15), 130 pages.
Bgpp Ts 38.101-1 V16.1.0 (2019-09), 3rd Generation Partnership Project; Technical Specification Group Radio Access Network; NR;User Equipment (UE) radio transmission and reception; Part 1: Range 1 Standalone(Release 16), 280 pages.
3GPP Tr 38.885 V16.0.0 (2019-03), 3rd Generation Partnership Project; Technical Specification Group Radio Access Network; NR; Study on NR Vehicle-to-Everything (V2X) (Release 16), 122 pages.
Bgpp Ts 38.300 V15.7.0 (2019-09), 3rd Generation Partnership Project; Technical Specification Group Radio Access Network; Nr; Nr and NG-RAN Overall Description;Stage 2(Release 15), 99 pages.
3GPP Tr 23.786 V16.1.0 (2019-06), 3rd Generation Partnership Project; Technical Specification Group Services and System Aspects; Study on architecture enhancements for the Evolved Packet System (EPS) and the 5G System (SGS) to support advanced V2X services (Release 16), 119 pages.
R2-1908299, Lg Electronics Inc., [Running CR] Introduction of 5G V2X with NR Sidelink, 3GPP Tsg-Ran WG2 Meeting #106, Reno, USA, May 13-17, 2019, 12 pages.
3GPP Ts 36.331 V15.7.0 (2019-09), 3rd Generation Partnership Project; Technical Specification Group Radio Access Network;Evolved Universal Terrestrial Radio Access (E-UTRA); Radio Resource Control (RRC);Protocol specification (Release 15), 962 pages.

* cited by examiner

COMMUNICATION METHOD AND RELATED PRODUCT TO ESTABLISH A LINK BETWEEN TWO COMMUNICATION DEVICES

This application is a national stage of International Application No. PCT/CN2020/116041, filed on Sep. 18, 2020, which claims priority to Chinese Patent Application No. 201910948196.X, filed Sep. 30, 2019. Both of the aforementioned applications are hereby incorporated by reference in their entireties.

TECHNICAL FIELD

This application relates to the field of communication technologies, and in particular, to a communication method and a related product.

BACKGROUND

To meet requirements of a public safety (PS) service, a long term evolution sidelink (LTE SL) is introduced. In addition, with rapid development of vehicle-to-everything (Vehicle-to-X, V2X) services and autonomous driving services, a long term evolution vehicle-to-everything sidelink (LTE V2X SL) is introduced. Therefore, sidelink technologies in the existing LTE scenario include the LTE SL and the LTE V2X SL.

Different from an uplink/downlink between a base station and a device, a sidelink is a communication link between devices. The introduction of the sidelink (SL) technologies is mainly to implement communication between devices in a scenario that is out of coverage of a base station. However, carriers used by a PS service vary in different countries, and carriers allocated by different operators to a V2X service vary in different countries. Therefore, in an LTE SL scenario or an LTE V2X SL scenario, to obtain service information sent by a transmit end, a receive end needs to blindly search for sidelink control information (SCI) sent by the transmit end on a physical sidelink control channel (PSCCH).

If the sidelink technologies (the LTE SL and the LTE V2X SL) in the LTE are directly reused in New Radio (NR), the receive end needs to blindly search for the SCI that is sent by the transmit end and that is carried on the PSCCH during sidelink communication between devices. This results in high communication overheads and high communication latency.

SUMMARY

This application provides a communication method and a related product, to resolve a problem of high communication latency in a sidelink.

According to a first aspect, an embodiment of this application provides a communication method that is applied to a first user terminal. The method includes:
sending a first message, where the first message includes a first link configuration parameter, and the first link configuration parameter is used to establish a first link; and
receiving a first acknowledgement message sent by a second user terminal, where the first acknowledgement message is used to indicate that the second user terminal completes establishment of the first link to the first user terminal.

In this embodiment of this application, when the first user terminal and the second user terminal establish the first link (which also is referred to as an initial connection in this application) of a sidelink, the second user terminal returns an acknowledgement message to the first user terminal to indicate completion of establishment of the first link, so that the two parties can know in time whether initial connection succeeds. In this way, whether service information can be transmitted between the two parties can be determined, which improves a success rate of service information transmission and resolves a problem that in the existing sidelink, service information transmission fails because both parties do not know whether a link is established between the two parties.

In an embodiment, before the sending a first message, the method further includes:
receiving a first configuration message sent by an access network device, where the first configuration message includes a first communication resource pool set, and the first communication resource pool set is used to determine the first link configuration parameter.

In this embodiment, the access network device schedules a communication resource, so as to allocate, to the first user terminal, an appropriate communication resource for initial connection, and determines the first link configuration parameter by using the communication resource. In this way, a success rate of initial connection can be improved.

In an embodiment, the method further includes:
sending a second message to the second user terminal through the first link, where the second message includes a second link configuration parameter, and the second link configuration parameter is used to establish a second link;
receiving a second acknowledgement message sent by the second user terminal, where the second acknowledgement message is used to indicate that the second user terminal completes establishment of the second link to the first user terminal; and communicating with the second user terminal through the second link.

In this embodiment, after the first link is established, when the first user terminal and the second user terminal perform service information transmission, the first user terminal may synchronize the communication resource for service transmission to the second user terminal through the established first link. In this way, when sidelink communication is performed, the second user terminal may directly perform service information transmission with the first user terminal by using a synchronized communication resource pool, without performing blind search. This improves a communication speed and reduces communication latency.

In an embodiment, before the second message is sent to the second user terminal through the first link, the method further includes:
receiving a second configuration message sent by the access network device, where the second configuration message includes a second communication resource pool set, and the second communication resource pool set is used to determine the second link configuration parameter.

In this embodiment, the access network device schedules the communication resource for the first user terminal to perform service information transmission, so that the first user terminal can obtain a current idle communication resource and implement sidelink communication.

In an embodiment, the first communication resource pool set includes a first carrier aggregation configuration. The first carrier aggregation configuration includes one or more frequency bands of a first carrier, and each frequency band of the first carrier is a licensed frequency band below 6 GHz in New Radio.

In this embodiment, because a frequency band below 6 GHz has a strong diffraction capability, the frequency band is suitable for carrying initial connection information, and thus the success rate of first link establishment is improved. In addition, security of a licensed frequency band is high. Security of initial connection is improved by using the licensed frequency band below 6 GHz for initial connection.

In an embodiment, the first configuration message includes one of first system information or a first radio resource control connection reconfiguration message.

In an embodiment, the second configuration message includes one of a second system information block or a second radio resource control connection reconfiguration message.

According to a second aspect, an embodiment of this application provides a communication method that is applied to a first user terminal. The method includes:
  after a first link to a second user terminal is established, sending a second message to the second user terminal through the first link, where the second message includes a second link configuration parameter, and the second link configuration parameter is used to establish a second link;
  receiving a second acknowledgement message sent by the second user terminal, where the second acknowledgement message is used to indicate that the second user terminal completes establishment of the second link to the first user terminal; and
  communicating with the second user terminal through the second link.

In this embodiment, because the first link is established in advance, when the first user terminal and the second user terminal perform service information transmission, the first user terminal may synchronize a communication resource for service transmission to the second user terminal through the established first link. In this way, when sidelink communication is performed, the second user terminal may directly perform service information transmission with the first user terminal by using a synchronized communication resource pool, without performing blind search. This improves a communication speed.

In an embodiment, before the second message is sent to the second user terminal through the first link, the method further includes:
  receiving a second configuration message sent by an access network device, where the second configuration message includes a second communication resource pool set, and the second communication resource pool set is used to determine the second link configuration parameter.

In this embodiment, the access network device schedules the communication resource for the first user terminal to perform service information transmission, so that the first user terminal can obtain a current idle communication resource and implement sidelink communication.

In an embodiment, the method further includes: sending a first message, where the first message includes a first link configuration parameter, and the first link configuration parameter is used to establish the first link; and
  receiving a first acknowledgement message sent by the second user terminal, where the first acknowledgement message is used to indicate that the second user terminal completes establishment of the first link to the first user terminal.

In this embodiment of this application, when the first user terminal and the second user terminal establish the first link of a sidelink, the second user terminal returns the acknowledgement message to the first user terminal to indicate completion of establishment of the first link. In this way, the two parties can know in time whether connection succeeds, to respond to initial connection in time, which improves a success rate of communication on the sidelink.

In an embodiment, before the sending a first message, the method further includes:
  receiving a first configuration message sent by the access network device, where the first configuration message includes a first communication resource pool set, and the first communication resource pool set is used to determine the first link configuration parameter.

In this embodiment, the access network device schedules the communication resource, so as to allocate, to the first user terminal, an appropriate communication resource for initial connection, and determines the first link configuration parameter by using the communication resource. In this way, a success rate of initial connection can be improved.

In an embodiment, the first communication resource pool set includes a first carrier aggregation configuration. The first carrier aggregation configuration includes one or more frequency bands of a first carrier, and each frequency band of the first carrier is a licensed frequency band below 6 GHz in New Radio.

In this embodiment, because a frequency band below 6 GHz has a strong diffraction capability, the frequency band is suitable for carrying initial connection information, and thus the success rate of first link establishment is improved. In addition, security of a licensed frequency band is high. Security of initial connection is improved by using the licensed frequency band below 6 GHz for initial connection.

In an embodiment, the first configuration message includes one of first system information or a first radio resource control connection reconfiguration message.

In an embodiment, the second configuration message includes one of a second system information block or a second radio resource control connection reconfiguration message.

According to a third aspect, an embodiment of this application provides a communication method that is applied to a second user terminal. The method includes:
  blindly searching for a first message sent by a first user terminal, where the first message includes a first link configuration parameter, and the first link configuration parameter is used to establish a first link; and
  sending a first acknowledgement message to the first user terminal, where the first acknowledgement message is used to indicate that the second user terminal completes establishment of the first link to the first user terminal.

In this embodiment, the second user terminal blindly searches for the first message sent by the first user terminal and returns the acknowledgement message to the first user terminal in time to indicate completion of establishment of the first link, so that the two parties can know in time whether initial connection succeeds. In this way, whether service information can be transmitted between the two parties can be determined, which improves a success rate of service information transmission and resolves a problem that in the existing sidelink, service information transmission fails because both parties do not know whether a link is established between the two parties.

In an embodiment, the method further includes:
  receiving a second message sent by the first user terminal through the first link, where the second message includes a second link configuration parameter, and the second link configuration parameter is used to establish a second link;

sending a second acknowledgement message to the first user terminal, where the second acknowledgement message is used to indicate that the second user terminal completes establishment of the second link to the first user terminal; and communicating with the first user terminal through the second link.

In this embodiment, after the first link is established, when the first user terminal and the second user terminal perform service information transmission, the first user terminal may synchronize a communication resource for service transmission to the second user terminal through the established first link. In this way, when sidelink communication is performed, the second user terminal may directly perform service information transmission with the first user terminal by using a synchronized communication resource pool, without performing blind search. This improves a communication speed.

According to a fourth aspect, an embodiment of this application provides a communication method that is applied to a second user terminal. The method includes:

after a first link to a first user terminal is established, receiving a second message sent by the first user terminal through the first link, where the second message includes a second link configuration parameter, and the second link configuration parameter is used to establish a second link;

sending a second acknowledgement message to the first user terminal, where the second acknowledgement message is used to indicate that the second user terminal completes establishment of the second link to the first user terminal; and communicating with the first user terminal through the second link.

In this embodiment, after the first link is established, when the first user terminal and the second user terminal perform service information transmission, the first user terminal may synchronize a communication resource for service transmission to the second user terminal through the established first link. In this way, when sidelink communication is performed, the second user terminal may directly perform service information transmission with the first user terminal by using a synchronized communication resource pool, without performing blind search. This improves a communication speed.

In an embodiment, before the receiving a second message sent by the first user terminal through the first link, the method further includes:

blindly searching for a first message sent by the first user terminal, where the first message includes a first link configuration parameter, and the first link configuration parameter is used to establish the first link; and sending a first acknowledgement message to the first user terminal, where the first acknowledgement message is used to indicate that the second user terminal completes establishment of the first link to the first user terminal.

In this embodiment of this application, when the first user terminal and the second user terminal establish the first link of a sidelink, the second user terminal returns the acknowledgement message to the first user terminal to indicate completion of establishment of the first link, so that the two parties can know in time whether initial connection succeeds. In this way, whether service information can be transmitted between the two parties can be determined, which improves a success rate of service information transmission and resolves a problem that in the existing sidelink, service information transmission fails because both parties do not know whether a link is established between the two parties.

According to a fifth aspect, an embodiment of this application provides a communication method, applied to a communications system that includes a first user terminal, a second user terminal, and an access network device. The method includes:

The first user terminal sends a first message, where the first message includes a first link configuration parameter, and the first link configuration parameter is used to establish a first link.

The second user terminal blindly searches for the first message.

The second user terminal sends a first acknowledgement message to the first user terminal, where the first acknowledgement message is used to indicate that the second user terminal completes establishment of the first link to the first user terminal.

In this embodiment of this application, when the first user terminal and the second user terminal establish the first link of a sidelink, the second user terminal returns the acknowledgement message to the first user terminal to indicate completion of establishment of the first link, so that the two parties can know in time whether initial connection succeeds. In this way, whether service information can be transmitted between the two parties can be determined, which improves a success rate of service information transmission and resolves a problem that in the existing sidelink, service information transmission fails because both parties do not know whether a link is established between the two parties.

In an embodiment, before that the first user terminal sends a first message, the method further includes:

The access network device sends a first configuration message to the first user terminal, where the first configuration message includes a first communication resource pool set, and the first communication resource pool set is used to determine the first link configuration parameter.

In this embodiment, the access network device schedules a communication resource, so as to allocate, to the first user terminal, an appropriate communication resource for initial connection, and determines the first link configuration parameter by using the communication resource. In this way, a success rate of initial connection can be improved.

In an embodiment, the method further includes:

The first user terminal sends a second message to the second user terminal, where the second message includes a second link configuration parameter, and the second link configuration parameter is used to establish a second link.

The second user terminal sends a second acknowledgement message to the first user terminal, where the second acknowledgement message is used to indicate that the second user terminal completes establishment of the second link to the first user terminal.

The first user terminal communicates with the second user terminal through the second link.

In this embodiment, after the first link is established, when the first user terminal and the second user terminal perform service information transmission, the first user terminal may synchronize the communication resource for service transmission to the second user terminal through the established first link. In this way, when sidelink communication is performed, the second user terminal may directly perform service information transmission with the first user terminal by using a synchronized communication resource pool, without performing blind search. This improves a communication speed and reduces communication latency.

In an embodiment, before that the first user terminal sends a second message to the second user terminal, the method further includes:

The access network device sends a second configuration message to the first user terminal, where the second configuration message includes a second communication resource pool set, and the second communication resource pool set is used to determine the second link configuration parameter.

In this embodiment, the access network device schedules the communication resource for the first user terminal to perform service information transmission, so that the first user terminal can obtain a current idle communication resource and implement sidelink communication.

In an embodiment, the first communication resource pool set includes a first carrier aggregation configuration. The first carrier aggregation configuration includes one or more frequency bands of a first carrier, and each frequency band of the first carrier is a licensed frequency band below 6 GHz in New Radio.

In this embodiment, because a frequency band below 6 GHz has a strong diffraction capability, the frequency band is suitable for carrying initial connection information, and thus the success rate of first link establishment is improved. In addition, security of a licensed frequency band is high. Security of initial connection is improved by using the licensed frequency band below 6 GHz for initial connection.

In an embodiment, the first configuration message includes one of first system information or a first radio resource control connection reconfiguration message.

In an embodiment, the second configuration message includes one of second system information or a second radio resource control connection reconfiguration message.

According to a sixth aspect, an embodiment of this application provides a user terminal, including:
a transceiver module, configured to send a first message, where the first message includes a first link configuration parameter, and the first link configuration parameter is used to establish a first link.

The transceiver module is further configured to receive a first acknowledgement message sent by a second user terminal, where the first acknowledgement message is used to indicate that the second user terminal completes establishment of the first link to a first user terminal.

In an embodiment, before sending the first message, the transceiver module is further configured to receive a first configuration message sent by the access network device. The first configuration message includes a first communication resource pool set, and the first communication resource pool set is used to determine the first link configuration parameter.

In an embodiment, the transceiver module is further configured to send a second message to the second user terminal through the first link, where the second message includes a second link configuration parameter, and the second link configuration parameter is used to establish a second link;
receive a second acknowledgement message sent by the second user terminal, where the second acknowledgement message is used to indicate that the second user terminal completes establishment of the second link to the first user terminal; and communicate with the second user terminal through the second link.

In an embodiment, before the second message is sent to the second user terminal through the first link,
the transceiver module is further configured to receive a second configuration message sent by the access network device. The second configuration message includes a second communication resource pool set, and the second communication resource pool set is used to determine the second link configuration parameter.

In an embodiment, the first communication resource pool set includes a first carrier aggregation configuration. The first carrier aggregation configuration includes one or more frequency bands of a first carrier, and each frequency band of the first carrier is a licensed frequency band below 6 GHz in New Radio.

In an embodiment, the first configuration message includes one of first system information or a first radio resource control connection reconfiguration message.

In an embodiment, the second configuration message includes one of a second system information block or a second radio resource control connection reconfiguration message.

According to a seventh aspect, an embodiment of this application provides a user terminal, including:
a transceiver module, configured to send a second message to a second user terminal through a first link after the first link to the second user terminal is established. The second message includes a second link configuration parameter, and the second link configuration parameter is used to establish a second link.

The transceiver module is further configured to receive a second acknowledgement message sent by the second user terminal. The second acknowledgement message is used to indicate that the second user terminal completes establishment of the second link to a first user terminal.

The transceiver module is further configured to communicate with the second user terminal through the second link.

In an embodiment, before sending the second message to the second user terminal through the first link, the transceiver module is further configured to receive a second configuration message sent by an access network device. The second configuration message includes a second communication resource pool set, and the second communication resource pool set is used to determine the second link configuration parameter.

In an embodiment, the transceiver module is further configured to send a first message, where the first message includes a first link configuration parameter, and the first link configuration parameter is used to establish the first link; and
receive a first acknowledgement message sent by the second user terminal, where the first acknowledgement message is used to indicate that the second user terminal completes establishment of the first link to the first user terminal.

In an embodiment, before sending the first message, the transceiver module is further configured to receive a first configuration message sent by the access network device. The first configuration message includes a first communication resource pool set, and the first communication resource pool set is used to determine the first link configuration parameter.

In an embodiment, the first communication resource pool set includes a first carrier aggregation configuration. The first carrier aggregation configuration includes one or more frequency bands of a first carrier, and each frequency band of the first carrier is a licensed frequency band below 6 GHz in New Radio.

In an embodiment, the first configuration message includes one of first system information or a first radio resource control connection reconfiguration message.

In an embodiment, the second configuration message includes one of a second system information block or a second radio resource control connection reconfiguration message.

According to an eighth aspect, an embodiment of this application provides a user terminal, including:

a transceiver module, configured to blindly search for a first message sent by a first user terminal. The first message includes a first link configuration parameter, and the first link configuration parameter is used to establish a first link.

The transceiver module is further configured to send a first acknowledgement message to the first user terminal. The first acknowledgement message is used to indicate that a second user terminal completes establishment of the first link to the first user terminal.

In an embodiment, the transceiver module is further configured to receive a second message sent by the first user terminal through the first link, where the second message includes a second link configuration parameter, and the second link configuration parameter is used to establish a second link;

send a second acknowledgement message to the first user terminal, where the second acknowledgement message is used to indicate that the second user terminal completes establishment of the second link to the first user terminal; and communicate with the first user terminal through the second link.

According to a ninth aspect, an embodiment of this application provides a user terminal, including:

a transceiver module, configured to receive a second message sent by a first user terminal through a first link after the first link to the first user terminal is established. The second message includes a second link configuration parameter, and the second link configuration parameter is used to establish a second link.

The transceiver module is further configured to send a second acknowledgement message to the first user terminal. The second acknowledgement message is used to indicate that a second user terminal completes establishment of the second link to the first user terminal.

The transceiver module is further configured to communicate with the first user terminal through the second link.

In an embodiment, before receiving the second message sent by the first user terminal through the first link, the transceiver module is further configured to blindly search for a first message sent by the first user terminal, where the first message includes a first link configuration parameter, and the first link configuration parameter is used to establish the first link; and send a first acknowledgement message to the first user terminal, where the first acknowledgement message is used to indicate that the second user terminal completes establishment of the first link to the first user terminal.

According to a tenth aspect, an embodiment of this application provides a communications system that includes a first user terminal, a second user terminal, and an access network device.

The first user terminal is configured to send a first message, where the first message includes a first link configuration parameter, and the first link configuration parameter is used to establish a first link.

The second user terminal is configured to blindly search for the first message.

The second user terminal is further configured to send a first acknowledgement message to the first user terminal, where the first acknowledgement message is used to indicate that the second user terminal completes establishment of the first link to the first user terminal.

In an embodiment, before the first message is sent by the first user terminal, the access network device is configured to send a first configuration message to the first user terminal. The first configuration message includes a first communication resource pool set, and the first communication resource pool set is used to determine the first link configuration parameter.

In an embodiment, the first user terminal is further configured to send a second message to the second user terminal. The second message includes a second link configuration parameter, and the second link configuration parameter is used to establish a second link.

The second user terminal is further configured to send a second acknowledgement message to the first user terminal. The second acknowledgement message is used to indicate that the second user terminal completes establishment of the second link to the first user terminal.

The first user terminal is further configured to communicate with the second user terminal through the second link.

In an embodiment, before the first user terminal sends the second message to the second user terminal, the access network device is further configured to send a second configuration message to the first user terminal. The second configuration message includes a second communication resource pool set, and the second communication resource pool set is used to determine the second link configuration parameter.

In an embodiment, the first communication resource pool set includes a first carrier aggregation configuration. The first carrier aggregation configuration includes one or more frequency bands of a first carrier, and each frequency band of the first carrier is a licensed frequency band below 6 GHz in New Radio.

In an embodiment, the first configuration message includes one of first system information or a first radio resource control connection reconfiguration message.

In an embodiment, the second configuration message includes one of second system information or a second radio resource control connection reconfiguration message.

According to an eleventh aspect, an embodiment of this application provides a user terminal. The user equipment has a function of implementing the user terminal in the sixth aspect, the seventh aspect, the eighth aspect, or the ninth aspect. The function may be implemented by hardware, or may be implemented by hardware executing corresponding software. The hardware or software includes one or more units corresponding to the foregoing function.

In a possible design, the user terminal includes: a transceiver module, where the transceiver module may be, for example, a transceiver, and the transceiver may include a radio frequency circuit and a baseband circuit. The transceiver module is configured to send a first message, where the first message includes a first link configuration parameter, and the first link configuration parameter is configured to establish a first link; and receive a first acknowledgement message sent by a second user terminal, where the first acknowledgement message is used to indicate that the second user terminal completes establishment of the first link to a first user terminal. In an example, the transceiver module may further include a sending module and a receiving module. For example, the sending module is configured to send the first message, where the first message includes the first link configuration parameter, and the first link configuration parameter is used to establish the first link. The receiving module is configured to receive the first acknowledgement message sent by the second user terminal, where the first acknowledgement message is used to indicate that the second user terminal completes establishment of the first link to the first user terminal. Optionally, the user terminal may further include a memory. The memory is configured to couple to the processor, and stores program instructions and data that are necessary for the user terminal.

In another possible design, the user terminal includes: a processor, a baseband circuit, a radio frequency circuit, and an antenna. The processor is configured to control functions of the circuits. The baseband circuit, the radio frequency circuit, and the antenna are configured to indicate communication between the user terminal and a terminal. For example, in downlink communication, the radio frequency circuit may perform processing such as digital conversion, filtering, amplification, and down-conversion on the first acknowledgement message that is sent by the second user terminal and that is received through the antenna. Decoding is performed by the baseband circuit, and decapsulation and encapsulation are performed according to a protocol, to obtain a request message of user terminal capability information. Optionally, the user terminal further includes a memory. The memory stores program instructions and data that are necessary for the user terminal. In uplink communication, the baseband circuit generates the first message, performs processing such as analog conversion, filtering, amplification, and up-conversion through the radio frequency circuit, and then transmits the first message through the antenna.

In still another possible implementation, the user terminal includes a processor and a modem. The processor may be configured to instruct or operate a system, to control a function of the user terminal. The modem may perform encapsulation, encoding and decoding, modulation and demodulation, equalization, and the like on data according to a protocol, to generate a request message that is sent to the access network device, so as to support the user equipment in performing a corresponding function in the first aspect. The modem may be further used by the access network device to respond to response information of the request message, to obtain a first coordination result that is of a communication resource of the user equipment and that is carried in the response message.

In yet another possible implementation, when the user terminal is a chip in the user terminal, the chip includes: a processing module and a transceiver module. The processing module may be, for example, a processor. The processor may be configured to perform processing such as filtering, demodulation, power amplification, and decoding on a data packet that is received by using the transceiver module and that carries a first request message. The transceiver module may be, for example, an input/output interface, a pin, or a circuit on the chip. The processing module may execute computer-executable instructions that are stored in a storage unit, to support the user terminal in performing a corresponding function in the foregoing first aspect, the second aspect, the third aspect, or the fourth aspect. Optionally, the storage unit may be a storage unit in the chip, for example, a register or a cache. Alternatively, the storage unit may be a storage unit that is in the user terminal and that is located outside the chip, for example, a read-only memory (ROM for short) or another type of static storage device that can store static information and instructions, or a random access memory (RAM for short).

According to a twelfth aspect, an embodiment of this application provides a communications apparatus, including a memory, a processor, and a program that is stored in the memory and that can be run on the processor. When executing the program, the processor implements the method in any possible implementation of the first aspect, the second aspect, the third aspect, or the fourth aspect.

According to a thirteenth aspect, an embodiment of this application provides a computer-readable storage medium that stores a computer program. When the program is executed by a processor, the method in any possible implementation of the first aspect, the second aspect, the third aspect, or the fourth aspect is implemented.

According to a fourteenth aspect, a computer program product including instructions is provided. When the computer program product is run on a computer, the computer is enabled to perform the method in any one of the first aspect, the second aspect, the third aspect, the fourth aspect, or any possible implementation thereof. The computer program product may be completely or partially stored in a storage medium encapsulated in a processor, or may be completely or partially stored in a storage medium encapsulated outside the processor.

DESCRIPTION OF EMBODIMENTS

Figure 1:
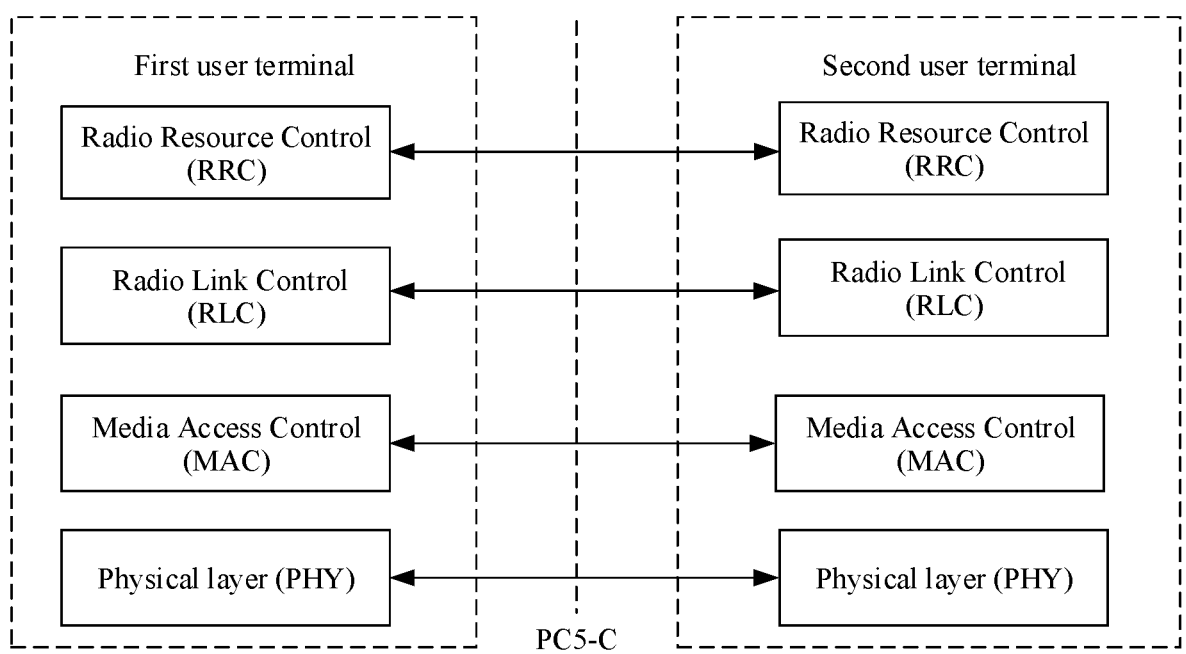
FIG. 1 is a schematic diagram of a control plane protocol stack according to an embodiment of this application.

The technical solutions in embodiments of this application can be applied to a fifth generation mobile communication technology (5G) or another communications system after 5G. This is not limited in embodiments of this application.

A user terminal in embodiments of this application may be a device that provides a user with voice and/or data connectivity, for example, may include a handheld device with a wireless connection function, or a processing device connected to a wireless modem. The user terminal may communicate with a core network through a radio access network (RAN), and exchange voice and/or data with the RAN. The user terminal may include a wireless user terminal, a mobile user terminal, a device-to-device (D2D) user terminal, a vehicle-to-everything (V2X) user terminal, a machine-to-machine/machine-type communications (M2M/MTC) user terminal, an Internet of Things (IoT) user terminal, a subscriber unit, a subscriber station, a mobile station, a remote station, an access point (AP), a remote terminal, an access terminal, a user terminal, a user agent, a user device, or the like. For example, the user terminal may include a mobile phone (or referred to as a "cellular" phone), a computer with a mobile user terminal, or a portable, pocket-sized, handheld, or computer built-in mobile apparatus. For example, the user terminal is a device such as a personal communication service (PCS) phone, a cordless phone, a session initiation protocol (SIP) phone, a wireless local loop (WLL) station, or a personal digital assistant (PDA). The user terminal further includes a limited device, for example, a device with low power consumption, a device with a limited storage capability, or a device with a limited computing capability. For example, the user terminal includes an information sensing device such as a barcode, radio frequency identification (RFID), a sensor, a global positioning system (GPS), or a laser scanner.

As an example rather than a limitation, in embodiments of this application, the user terminal may be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn on the body or integrated into a cloth or an accessory of a user. The wearable device is more than a hardware device. The wearable device implements powerful functions through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

If the various user terminals described above are located on vehicles (for example, placed or installed in the vehicles), the terminals may be considered as in-vehicle user terminals. For example, an in-vehicle user terminal is also referred to as an on-board unit (OBU). Embodiments of this application set no limitation thereto.

An access network (AN) device in embodiments of this application includes a next generation NodeB (gNB) in a 5G New Radio (NR) system.

In embodiments of this application, "at least one" means one or more, and "a plurality of" means two or more than two. The term "and/or" describes an association relationship between associated objects and indicates that three relationships may exist. For example, A and/or B may indicate the following cases: Only A exists, both A and B exist, and only B exists, where A and B may be singular or plural. The character "I" usually indicates an "or" relationship between associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, but are not intended to limit an order, a time sequence, priorities, or importance of the plurality of objects. For example, first information and second information are merely intended to distinguish between different information, but do not indicate that the two types of information are different in content, priority, sending sequence, importance, or the like.

For ease of understanding of this application, related technological knowledge in embodiments of this application is first described herein.

An LTE sidelink (LTE SL) is introduced in the 3GPP Release 12 for the first time. Different from an uplink/downlink between a base station and a device, the sidelink is a communication link between devices. An original purpose of introducing the sidelink is to implement communication between devices in a scenario that is out of coverage of a base station in some public safety (PS) services (for example, an emergency communication scenario). With the rapid development of vehicle-to-everything (V2X) and autonomous driving services, an LTE V2X sidelink (LTE V2X SL) based on a sidelink technology of Release 12/13 is introduced in LTE Release 14, which is also referred to as C-V2X. Therefore, existing LTE sidelink technologies include LTE SL and LTE V2X SL.

In addition, it is specified in TS 38.101 and TR 38.885 that a frequency band available for the sidelink in an NR scenario includes an unlicensed (ITS) frequency band and a licensed frequency band. A center frequency of the ITS frequency band is 5.9 Hz. Bandwidth allocated to the sidelink in the NR scenario varies in different countries. Usually, the bandwidth is between 9 MHz and 80 MHz. The licensed frequency band includes an FR1 (Frequency range 1) and an FR2 (Frequency range 2). The FR1 is also referred to as Sub 6 GHz, which is a licensed frequency band below 6 GHz. The FR2 is a licensed frequency band above 6 GHz but below 52.6 GHz.

In addition, an operating mode of a UE on the sidelink is described. The operating mode includes Scheduled mode and UE-selected mode. In Scheduled mode, the UE is in an RRC_CONNECTED state with and a base station. The UE requests a sidelink communication resource from the base station, and the base station configures control information and the communication resource for the UE. Specifically, the UE sends a request message to the base station, where the request information may be one of a service request (SR), random access (RA), and a sidelink buffer state report (SL BSR). Based on the request message, the base station can learn that the UE needs to perform communication on the sidelink, determine the communication resource for the UE, and complete scheduling the communication resource for the sidelink. In UE-selected mode, the UE autonomously selects the control information and the communication resource from a preconfigured communication resource pool set.

It should be noted that the LTE SL technology supports broadcast, multicast, and unicast services, while the LTE V2X SL technology supports only the broadcast service.

FIG. 1 shows a control plane protocol stack corresponding to a broadcast scenario and a multicast scenario of the LTE SL and the LTE V2X SL. As shown in FIG. 1, in the broadcast or multicast scenario, a first user terminal (transmit end) broadcasts or multicasts service information of the first user terminal according to an information transmission manner in the control plane protocol stack. A second user terminal (receive end) blindly searches for, according to the information transmission manner in the control plane protocol stack, the service information sent by the transmit end on a plurality of carriers.

Figure 2:
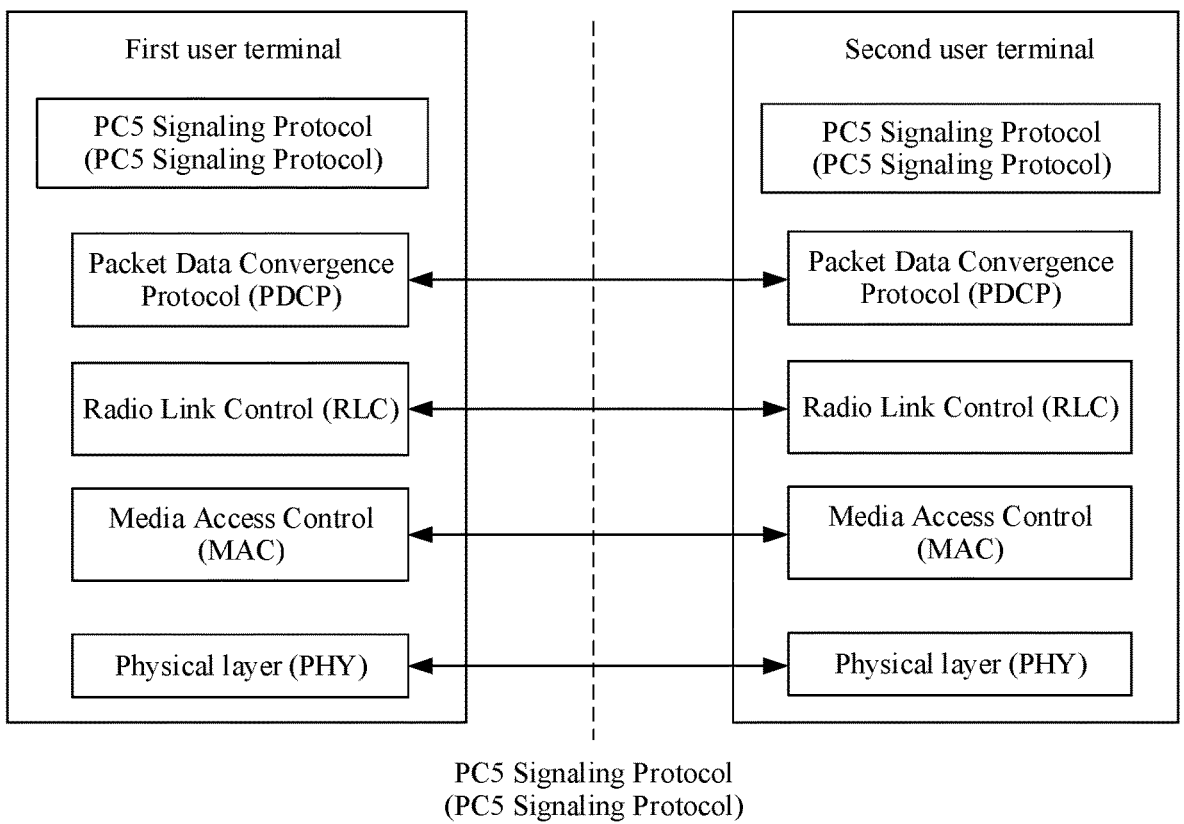
FIG. 2 is a schematic diagram of another control plane protocol stack according to an embodiment of this application.

FIG. 2 shows a control plane protocol stack corresponding to an LTE SL unicast scenario. As shown in FIG. 2, a PC5 Signaling Protocol layer is introduced in the unicast scenario, but the PC5 Signaling Protocol layer is introduced in the unicast scenario only to detect whether a first user terminal and a second user terminal are out of a maximum range that can be supported by a sidelink, that is, to determine, by ranging, whether the first user terminal and the second user terminal are out of the maximum range supported by the sidelink, and that a communication resource is not synchronized by using the PC5 Signaling Protocol. Therefore, in the LTE SL unicast scenario, a receive end still needs to blindly search on a plurality of carriers for service information sent by a transmit end. Therefore, on the sidelink, the receive end needs to blindly search, on the plurality of carriers, for the service information (control information and data information) sent by the transmit end, for example, blindly search for SCI that is sent by a transmit terminal and that is carried on a PSCCH. In this case, receive terminals perform sidelink communication, which causes high transmission latency and affects user experience.

An NR sidelink (NR SL) based on reuse of the LTE sidelink is introduced in NR Release 16. The NR SL is used in a plurality of scenarios such as augmented reality (AR)/virtual reality (VR), industrial robot collaboration, and V2X. In these scenarios, latency requirements are high. For example, in a typical VR scenario of the NR SL, a latency requirement is 10 ms. Each scenario supports a plurality of carrier types, for example, an ITS carrier in the V2X and a millimeter wave/unlicensed carrier supported in the AR/VR.

If the NR SL directly reuses the conventional LTE SL/V2X SL technology for sidelink communication, that is, the receive end blindly searches on a receiving communication resource pool set for the SCI that is carried on the PSCCH and that is sent by the transmit end. However, because there are more types of NR SL carriers, the receiving communication resource pool set needs to be expanded, which causes huge overheads in a blind search process and causes considerable latency. In a plurality of scenarios, the NR SL technology cannot be used, and a communication requirement of a user cannot be met.

Figure 3:
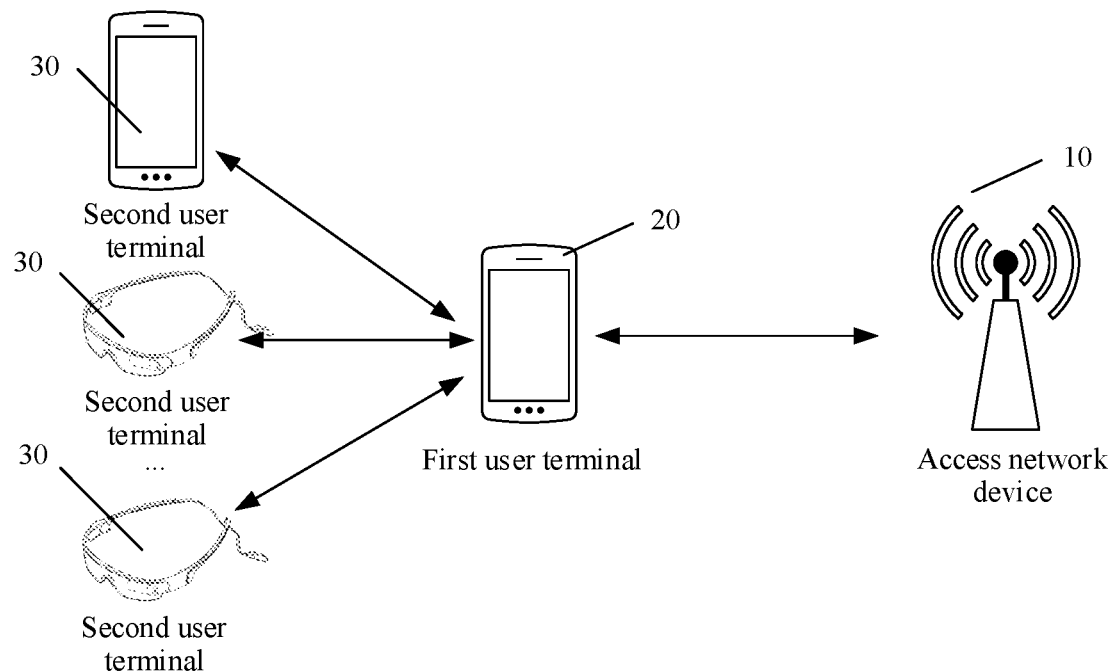
FIG. 3 is a schematic diagram of a communication architecture according to an embodiment of this application.

FIG. 3 is a diagram of a communication architecture according to an embodiment of this application. The architecture includes: an access network device 10, a first user terminal 20, and a second user terminal 30. The first user terminal 20 (transmit end) and the second user terminal 30 (receive end) may operate in Scheduled mode or UE-selected mode to perform sidelink communication.

Specifically, when the first user terminal starts a function of a sidelink, for example, the first user terminal 20 establishes a radio resource control (RRC) connection to the access network device 10, the first user terminal 20 may request the access network device to schedule a communication resource, to obtain a communication resource pool for establishing an initial connection. When the first user terminal 20 does not establish an RRC connection to the access network device 10, the first user terminal 20 may select, from a preconfigured communication resource pool set, the communication resource pool for establishing an initial connection. Then, the first user terminal 20 sends a first message to the second user terminal by using the obtained communication resource pool, and establishes a first link to the second user terminal 30. In this embodiment of this application, the first link may also be referred to as an initial link.

After the first link is established, service transmission needs to be performed between the first user equipment 10 and the second user equipment 20. When the first user terminal 20 establishes the RRC connection to the access network device 10, the first user terminal 20 may request the access network device to reschedule a communication resource, to obtain a communication resource pool set for service transmission. Alternatively, when the first user terminal 20 does not establish the RRC connection to the access network device 10, the first user terminal 20 may select, from a preconfigured communication resource pool set, the communication resource pool set for service transmission. Then, the first user terminal 20 determines a second link configuration parameter based on the obtained communication resource pool set; sends a second message to the second user terminal through the first link, where the second message includes the second link configuration parameter; and establishes a second link to the second user terminal based on the second link configuration parameter. The first user terminal 20 may perform service transmission with the second user terminal 30 through the second link.

The first link and the second link may be a same link, or may be different links.

It should be noted that, as shown in FIG. 3, when the first user terminal 20 needs to communicate with a plurality of second user terminals 30 simultaneously, the first user terminal 20 may further allocate resources in the obtained communication resource pool or communication resource pool set, and separately establish initial connection and perform service transmission with the plurality of second user terminals 30 by using the allocated communication resources.

It can be learned that in this implementation, on the sidelink, the first user terminal and the second user terminal first establish the initial connection. When the first user terminal and the second user terminal perform service transmission, the first user terminal may first synchronize a communication resource for service transmission through the initial connection. Therefore, when service transmission is performed, the second user terminal does not need to blindly search for service information sent by the first user terminal. Communication latency caused by blind search on the sidelink is avoided, and a communication speed is improved, which further improves user experience.

Figure 4:
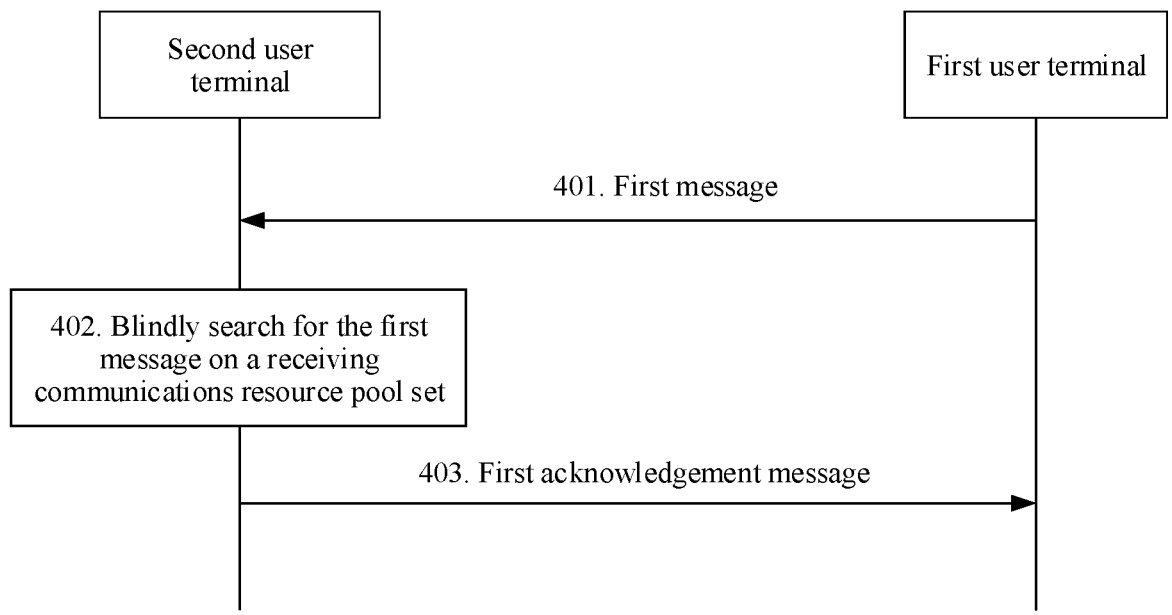
FIG. 4 is a schematic flowchart of a communication method according to an embodiment of this application.

FIG. 4 is a schematic flowchart of a communication method according to an embodiment of this application. The method includes but is not limited to the following operations.

Operation 401: A first user terminal sends a first message to a second user terminal.

The first message includes a first link configuration parameter, and the first link configuration parameter is used to establish a first link. In this embodiment of this application, the first link may also be referred to as an initial link.

The first user terminal sends the first message to the second user terminal by using an obtained first communication resource pool set, where the first communication resource pool set is obtained by the first user terminal from an access network device or from a preconfigured communication resource pool set. The first communication resource pool set includes one or more first communication resource pools, and each first communication resource pool corresponds to one frequency band.

Specifically, when the first user terminal is in coverage of the access network device and an RRC connection is established, the first user terminal may request the access network device to schedule a communication resource, to obtain the first communication resource pool set. When the first user terminal is out of the coverage of the access network device, the first user terminal cannot request the access network device to schedule the communication resource. In this case, the first user terminal may select the first communication resource pool set from the preconfigured communication resource pool set.

When the first communication resource pool set includes one first communication resource pool, the first user terminal sends the first message by using the first communication resource pool. The first link configuration parameter is determined by the first communication resource pool. That is, the first user terminal sends the first message by using the frequency band corresponding to the first communication resource pool, and establishes the first link to the second user terminal by using the frequency band.

When the first communication resource pool set includes a plurality of communication resource pools, the first user terminal senses (sensing) a congestion status of each communication resource pool, and selects a target first communication resource pool that is in a best condition from the first communication resource pool set to send the first message. The first link configuration parameter may or may not be determined by the target first communication resource pool. When the first link configuration parameter is not determined by the target first communication resource pool, the first message is sent by using a frequency band corresponding to the target first communication resource pool. However, due to other reasons (for example, because the first user terminal is in a moving state, after the first message is sent, the target first communication resource pool is no longer the communication resource pool in the best condition), the first link needs to be established to the second user terminal by using a frequency band corresponding to another communication resource pool, to increase a success rate of establishing the first link.

For example, the first communication resource pool set includes a frequency band A, a frequency band B, and a frequency band C. When the first user terminal senses a congestion status of each frequency band and learns that the frequency band A is in the best condition, the first user terminal sends the first message by using the frequency band A, and establishes the first link by using the frequency band A. However, the first user terminal senses that the frequency band A is in the best condition at a current location. Because of movement of the first user terminal, the frequency band A may no longer be suitable for the first link connection. To improve a success rate of connection, the first link needs to be established by using the frequency band B, to increase the success rate of establishing the first link. Therefore, a first link configuration parameter corresponding to the frequency band B may be determined.

In addition, when the first communication resource pool set includes the plurality of first communication resource pools, the first user terminal may further periodically send the first message by using the plurality of first communication resource pools, that is, periodically send the first message on the plurality of first communication resource pools. In this case, the second user terminal can blindly search for and find the first message on a plurality of first communication resources, which improves a success rate of blind search. In this case, the first link configuration parameter may be determined by any first communication resource pool in the plurality of first communication resource pools, that is, the first link to the second user terminal is established by using any first communication resource pool in the plurality of first communication resource pools. Alternatively, a first user determines, by sensing, the target first communication resource pool optimal for establishing the first link in the plurality of first communication resource pools, and uses the target first communication resource pool to establish the first link.

For example, the first user terminal may send the first message by using the frequency band A in a time period 0 to t1, send the first message by using the frequency band B in a time period t1 to t2, and send the first message by using the frequency band C in a time period t2 to t3. When the first message is sent on the plurality of frequency bands, the second user terminal may blindly search for and find the first message on the plurality of frequency bands, which improves the success rate of blind search. If it is determined that the frequency band A is most suitable for establishing the first link, a first link configuration parameter corresponding to the frequency band A may be determined, which further improves the success rate of establishing of the first link.

Further, the first link configuration parameter further includes indication information of a time-frequency resource block available for the first user terminal in a time-frequency resource of the first communication resource pool and indication information of a time-frequency resource block that is used by the second user terminal.

For example, when the first user terminal and the second user terminal establish the first link by using the frequency band A, the first link configuration parameter further includes the indication information of the time-frequency resource block available for the first user terminal in the frequency band A, where the indication information is used to indicate that the first user terminal can exchange information with the second user terminal on the time-frequency resource block, and includes the indication information of the time-frequency resource block available for the second user terminal, where the indication information is used to indicate that the second user terminal can exchange information with the first user terminal on the time-frequency resource block.

Figure 5:
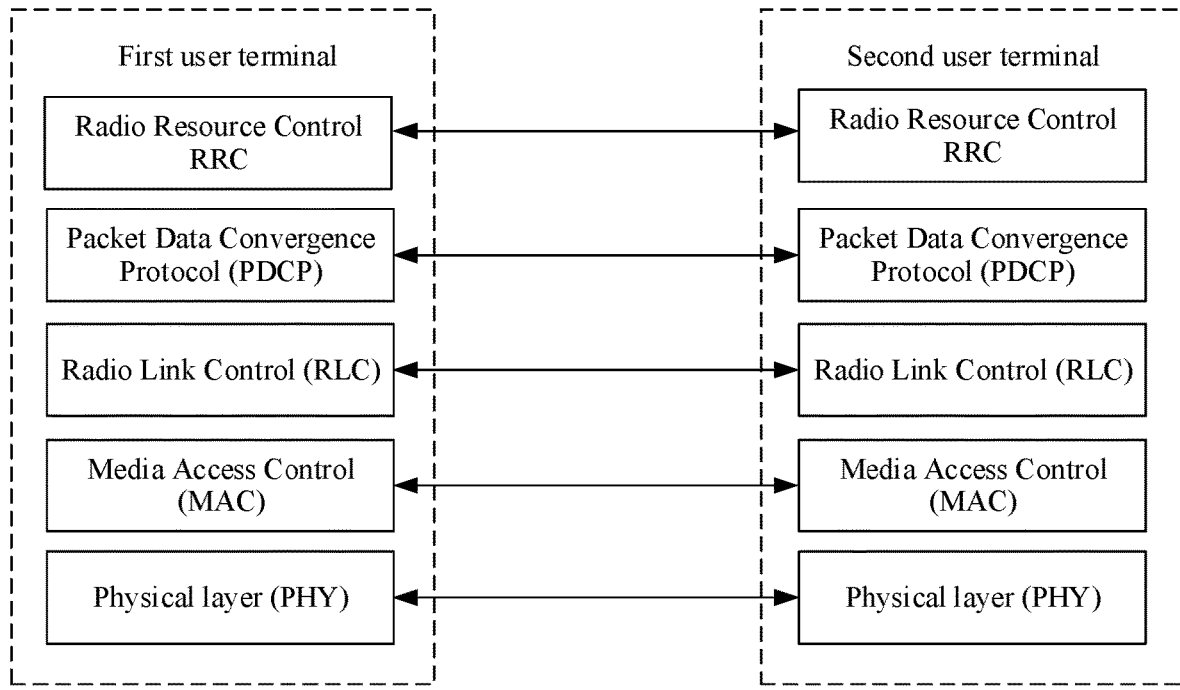
FIG. 5 is a schematic diagram of another control plane protocol stack according to an embodiment of this application.

In addition, according to the latest standard progress, adding an NR SL to TS 38.300 is being discussed. For details, refer to R2-1908299 Running CR to 38 300 for 5G V2X with NR sidelink. As shown in FIG. 5, an RRC layer is added to a control plane protocol stack in a unicast scenario in NR, and RRC functions are specified as follows: (1) Transfer a PC5-RRC message between the first user terminal and the second user terminal. (2) Maintain context between the first user terminal and the second user terminal by using the PC5-RRC message. (3) Information that may be exchanged in a plurality of PC5-RRC messages includes at least UE capability and AS-layer (AS-Layer) configuration. Therefore, the first user terminal and the second user terminal may transmit a message by using the RRC layer. Therefore, the first user terminal may send the first message to the second user terminal by using the RRC layer through a PC5 interface.

Operation 402: The second user terminal blindly searches for the first message on a receiving communication resource pool set.

The receiving communication resource pool set is a preconfigured communication resource pool set, or a final receiving resource pool set including a preconfigured communication resource pool set and a receiving communication resource pool set allocated by the access network device. The access network device is an access network device of a cell in which the second user terminal is located and/or an access network device of a neighbor cell. An access network device requested by the first user terminal is only an access network device of a current cell.

Specifically, when the second user terminal is out of coverage of a base station, the second user terminal performs blind search by using the preconfigured receiving communication resource pool set. When the second user terminal is in the coverage of the base station, the second user terminal requests the access network device to allocate the receiving communication resource pool set. In addition to requesting the access network device of the current cell to allocate the receiving communication resource pool set, the second user terminal further requests the access network device of the neighbor cell to allocate the receiving communication resource pool set. This prevents a case in which the second user terminal fails to find the first message through blind search because the first communication resource pool set used by the first user terminal does not match the receiving communication resource pool set used by the second user terminal when the first user terminal and the second user terminal are located in different cells. However, the first user terminal requests the access network device of the current cell to allocate the first communication resource pool set. Therefore, a frequency band range in the final receiving communication resource pool set obtained by the second user terminal is definitely greater than or equal to a frequency band range in the first communication resource pool set. In this case, the second user terminal can definitely blindly search for and find the first message sent by the first user terminal in the final communication resource pool set. This resolves a problem that a link cannot be established because a transmit end and a receive end use an unmatched frequency band in a sidelink, which causes a communication failure.

In addition, a newly added carrier in the NR PC5 is not suitable for carrying initial connection information, for example, a diffraction capability of a millimeter wave is poor, and security of an unlicensed frequency band is poor. Therefore, it may be specified that one or more frequency bands in the first communication resource pool set and one or more frequency bands in the receiving communication resource pool set are all licensed frequency bands below 6 GHz in the NR. A signal waveform on the licensed frequency band below 6 GHz has strong diffraction capability and high security, and is suitable for carrying the initial connection information. Therefore, using the licensed frequency band of 6 GHz for initial connection not only ensures security of initial connection, but also improves a success rate of initial connection.

Operation 403: The second user terminal sends a first acknowledgement message to the first user terminal.

After receiving the first message, if the second user terminal directly establishes the first link to the first user terminal through the first link configuration parameter, the first acknowledgement message may be used to indicate that the second user terminal completes establishment of the first link to the first user terminal. If the second user terminal does not directly establish the first link to the first user terminal after receiving the first message, but agrees to establish the first link to the first user terminal, the first acknowledgement message may be used to indicate that the second user terminal agrees to establish the first link to the first user terminal. If the second user terminal does not establish the first link to the first user terminal after receiving the first message, the first acknowledgement message may be alternatively used to indicate that the second user terminal refuses to establish the first link to the first user terminal. In this application, establishment of the first link to the first user terminal is used as an example for specific description, but this is not limited.

After the second user terminal receives the first message and completes establishment of the first link to the first user terminal, the second user terminal may send the first acknowledgement message to the first user terminal through the first link by using the time-frequency resource block obtained through division. If the second user terminal receives the first message but does not complete establishment of the first link to the first user terminal, the second user terminal may send the first acknowledgement message to the second user terminal by using the time-frequency resource block obtained through division in the first communication resource pool.

It can be learned that, in this implementation, when the first user terminal and the second user terminal establish the first link of the sidelink, the second user terminal returns the acknowledgement message to the first user terminal in time to indicate completion of establishment of the first link, so that the two parties can know in time whether initial connection succeeds. In this way, whether service information can be transmitted between the two parties can be determined, which improves a success rate of service information transmission and resolves a problem that in the existing sidelink, service information transmission fails because both parties do not know whether a link is established between the two parties.

Figure 6:
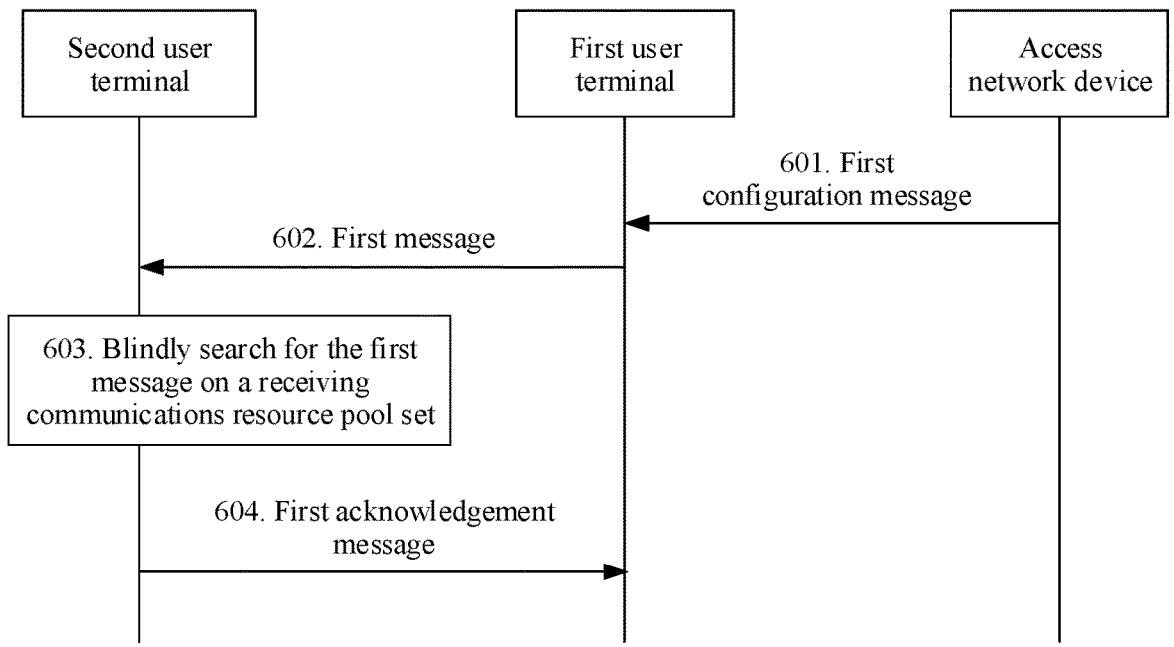
FIG. 6 is a schematic flowchart of another communication method according to an embodiment of this application.

FIG. 6 is another communication method according to an embodiment of this application. Content in this embodiment that is the same as that in the embodiment shown in FIG. 4 is not described herein again. The method includes but is not limited to the following operations.

Operation 601: An access network device sends a first configuration message to a first user terminal.

The first configuration message includes the foregoing first communication resource pool set.

In addition, before obtaining the first configuration message sent by the access network device, the first user terminal sends a request message to the access network device. The request message is used to request the access network device to allocate communication resources for establishing an initial connection on a sidelink. The request message may be one of an SR, RA, or an SL BSR in LTE, that is, a field corresponding to a function of the request message is added to the SR, the RA, and the SL BSR, or may be a new message mechanism in NR. This is not limited in this application.

Operation 602: The first user terminal sends a first message to a second user terminal by using the first communication resource pool set.

Operation 603: The second user terminal blindly searches for the first message on a receiving communication resource pool set.

Operation 604: The second user terminal sends a first acknowledgement message to the first user terminal.

It can be learned that, in this implementation, when the first user terminal and the second user terminal establish the first link of the sidelink, the second user terminal returns the acknowledgement message to the first user terminal to indicate completion of establishment of the first link, so that the two parties can know in time whether the initial connection succeeds. In this way, whether service information can be transmitted between the two parties can be determined, which improves a success rate of service information transmission. This also resolves a problem that in the existing sidelink, service information transmission fails because both parties do not know whether a link is established between the two parties. In addition, the first user terminal may obtain the first communication resource pool set in a plurality of manners, to improve flexibility and a success rate of establishing the first link.

Figure 7:
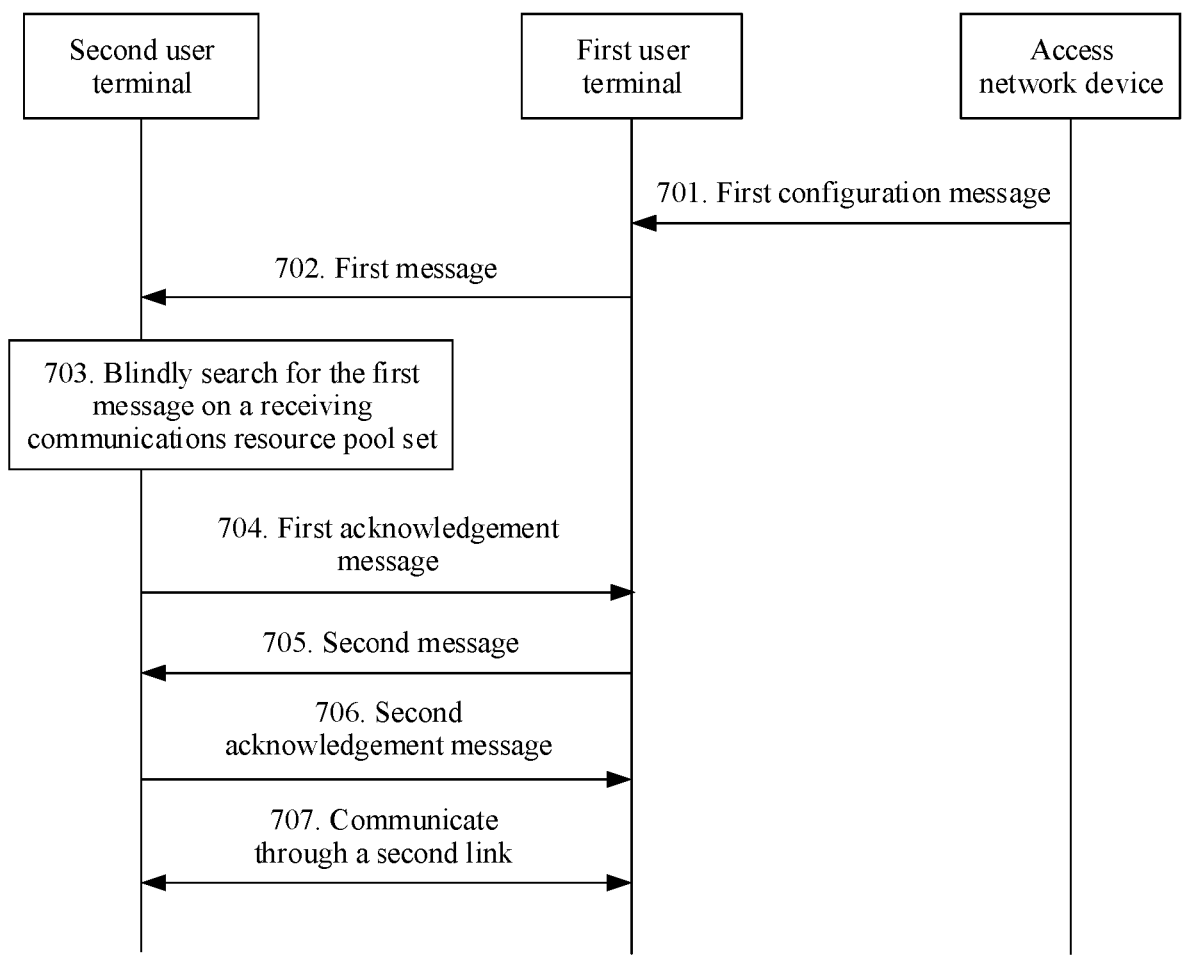
FIG. 7 is a schematic flowchart of another communication method according to an embodiment of this application.

FIG. 7 is another communication method according to an embodiment of this application. Content in this embodiment that is the same as that in the embodiments shown in FIG. 4 and FIG. 6 is not described herein again. The method includes but is not limited to the following operations.

Operation 701: An access network device sends a first configuration message to a first user terminal.

Operation 702: The first user terminal sends a first message to a second user terminal by using a first communication resource pool set.

Operation 703: The second user terminal blindly searches for the first message on a receiving communication resource pool set.

Operation 704: The second user terminal sends a first acknowledgement message to the first user terminal.

Operation 705: The first user terminal sends a second message to the second user terminal through a first link.

The second message includes a second link configuration parameter.

After the first link (initial connection) is established, the first user terminal and the second user terminal remain connected. When the first user terminal sends service information to the second user terminal, the first user terminal first obtains a second communication resource pool set for sending the service information. The second communication resource pool set includes one or more second communication resource pools, and the first user terminal may establish a second link to the first user terminal by using the one or more second communication resource pools. Frequency bands in the one or more second communication resource pools are all frequency bands available for a sidelink in an NR scenario.

It should be noted that the second communication resource pool set and the first communication resource pool set may be a same resource pool set, or may be different resource pool sets. Similarly, the first communication resource for establishing the second link and the first communication resource pool for establishing the first link may be a same resource pool, or may be different resource pools.

When the communication resource pools for establishing the second link and the first link are the same, link reestablishment does not need to be performed between the first user terminal and the second user terminal. Therefore, the first user terminal indicates, by using the second message, that the second user terminal can transmit the service information on the first link. Further, a time-frequency resource block used by the first user terminal to transmit the service information may be the same as or different from a corresponding time-frequency resource block in the first link. It should be noted that, when the time-frequency resource blocks are also the same, the second message only needs to carry indication information (the second link configuration parameter does not need to be carried), and the indication information is used to indicate the second user terminal to transmit the service information according to the time-frequency resource block configured in the first link. When the time-frequency resource blocks are different, a time-frequency resource in the communication resource pool needs to be re-divided. In this case, the second link configuration parameter is indication information for re-division into the time-frequency resource block. The second user terminal is indicated, by the indication information, to transmit the service information on the first link according to a time-frequency resource block obtained through re-division.

When the communication resource pools for establishing the second link and the first link are different, the second link needs to be reestablished between the first user terminal and the second user terminal, and the second link configuration parameter is used to establish the second link. In addition, the link configuration parameter includes indication information indicating that a time-frequency resource block of the second communication resource pool is obtained through division, so that the first user terminal and the second user terminal can transmit the service information on the second link according to the time-frequency resource block obtained through division.

Operation 706: The second user terminal sends a second acknowledgement message to the first user terminal.

The second acknowledgement message may have a same function as the first acknowledgement message. The second acknowledgement message may be used to indicate that the second user terminal completes establishment of the second link to the first user terminal; or may be used to indicate that the second user terminal agrees to establish the second link to the first user terminal; or may be used to indicate that the second user terminal refuses to establish the second link to the first user terminal.

If service transmission is performed between the second user terminal and the first user terminal through the first link, the second user terminal may send the second acknowledgement message to the first user terminal through the first link. If the second link needs to be reestablished between the second user terminal and the first user terminal, the second acknowledgement message may first be sent to the first user terminal through the first link, and then the first link is released; or the first link is released first, and the second user terminal sends the first information to the first user terminal by using the time-frequency resource block obtained through division in the second communication resource pool.

Operation 707: The first user terminal communicates with the second user terminal through the second link.

It can be learned that, in this embodiment of this application, when the first user terminal and the second user terminal establish the first link of the sidelink, the second user terminal returns the acknowledgement message to the first user terminal to indicate completion of establishment of the first link, so that the two parties can learn in time whether the initial connection succeeds. This resolves the existing problem that in the sidelink, service information transmission fails because both parties do not know whether a link is established between the two parties. In addition, after the first link is established, when the first user terminal and the second user terminal perform service information transmission, the first user terminal may synchronize a communication resource for service information transmission to the second user terminal through the established first link. In this way, when sidelink communication is performed, the second user terminal may directly perform service information transmission with the first user terminal by using a synchronized communication resource pool, without performing blind search. This improves a communication speed and reduces communication latency.

Figure 8:
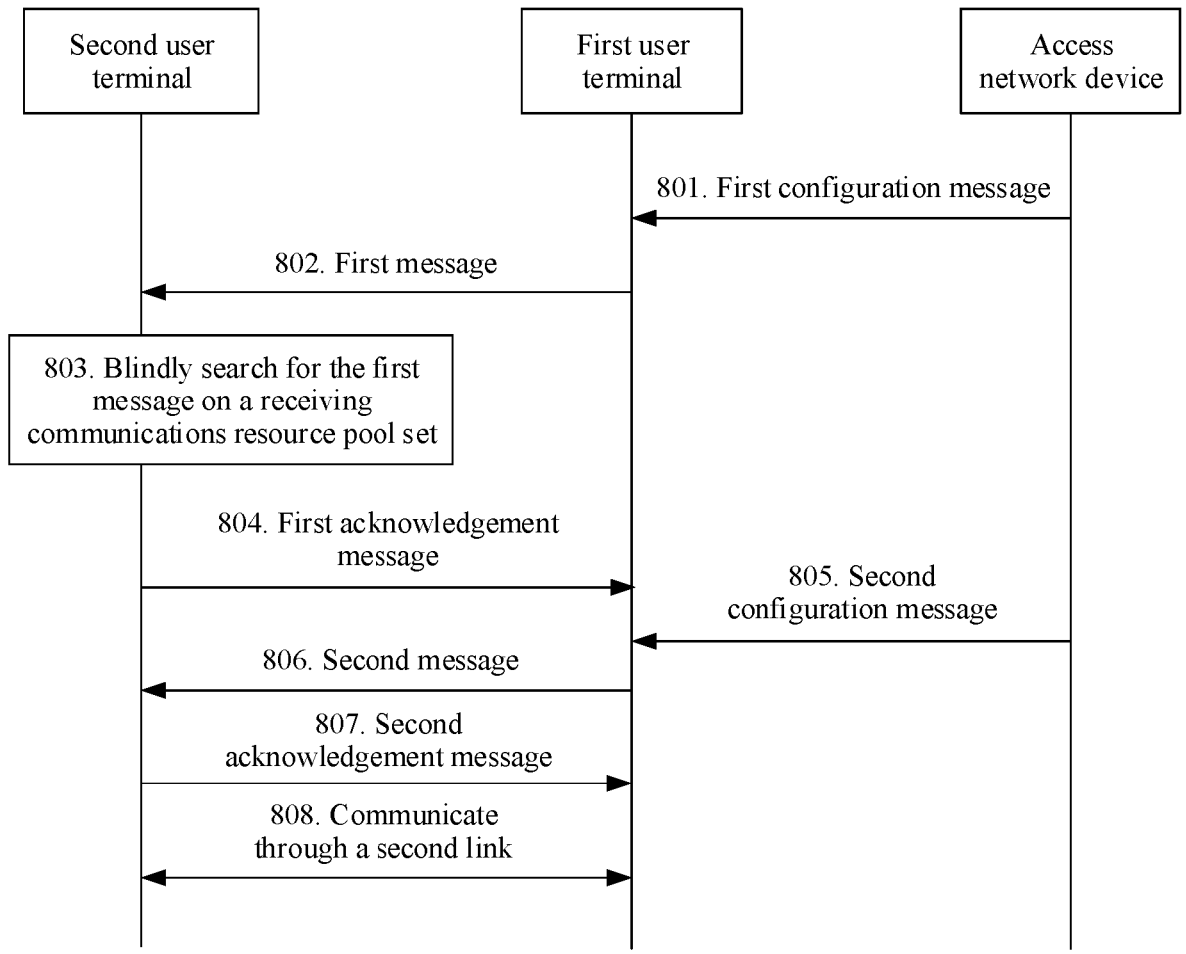
FIG. 8 is a schematic flowchart of another communication method according to an embodiment of this application.

FIG. 8 is another communication method according to an embodiment of this application. Content in this embodiment that is the same as that in the embodiments shown in FIG. 4, FIG. 6, and FIG. 7 is not described herein again. The method includes but is not limited to the following operations.

Operation 801: An access network device sends a first configuration message to a first user terminal.

Operation 802: The first user terminal sends a first message to a second user terminal by using a first communication resource pool set.

Operation 803: The second user terminal blindly searches for the first message on a receiving communication resource pool set.

Operation 804: The second user terminal sends a first acknowledgement message to the first user terminal.

Operation 805: The access network device sends a second configuration message to the first user terminal.

The second configuration message includes at least the foregoing second communication resource pool set.

Specifically, when the first user terminal requests the access network device to allocate a communication resource for service transmission, the access network device determines, based on a current communication resource allocation status, a second communication resource pool set available for the first user terminal, and then, indicates, by using the second configuration message, a communication resource pool set available for the first user terminal. In addition, the second configuration message further includes indication information of an operating mode. When the indication information indicates that the first user terminal operates in UE-selected mode, the indication information may be used to indicate that the first user terminal can use all resources of the communication resource pool set. The communication resource pool is the foregoing second communication resource pool set. When the indication information indicates that the first user terminal operates in Scheduled mode, the indication information may be used to indicate that the communication resource pool set is a candidate communication resource pool set, and the first user terminal needs to select the foregoing second communication resource pool set from the candidate communication resource pool set by sensing.

Sensing is a conventional technology, and is not described again.

In addition, before obtaining the second configuration message sent by the access network device, the first user terminal may send a request message to the access network device. The request message is used to request the access network device to allocate communication resources for transmitting service information. The request message may be one of an SR, RA, or an SL BSR in LTE, that is, a field corresponding to a function of the request message is added to the SR, the RA, and the SL BSR, or the request message may be a new message mechanism in NR. This is not limited in this application.

Operation 806: The first user terminal sends a second message to the second user terminal through a first link.

Operation 807: The second user terminal sends a second acknowledgement message to the first user terminal.

Operation 808: The first user terminal communicates with the second user terminal through a second link.

It can be learned that, in this embodiment of this application, when the first user terminal and the second user terminal establish the first link of the sidelink, the second user terminal returns the acknowledgement message to the first user terminal to indicate completion of establishment of the first link, so that the two parties can learn in time whether initial connection succeeds. This resolves the existing problem that in a sidelink, service information transmission fails because both parties do not know whether a link is established between the two parties. In addition, after the first link is established, when the first user terminal and the second user terminal perform service information transmission, the first user terminal may synchronize a communication resource for service information transmission to the second user terminal through the established first link. In this way, when sidelink communication is performed, the second user terminal may directly perform service information transmission with the first user terminal by using a synchronized communication resource pool, without performing blind search. This improves a communication speed and reduces communication latency.

In an embodiment, the foregoing first configuration message may be one of a first system information block (SIB), a first radio resource control connection reconfiguration (RRC Connection Reconfiguration) message, or a new message mechanism. That is, a communication resource pool set that is in an NR scenario is added to an original SIB or RRC connection reconfiguration field of LTE. The access network device may send the first communication resource pool set to the first user terminal by using the first SIB or the first RRC connection reconfiguration message; or the access network device sends the first communication resource pool set to the user terminal by using the new message mechanism. This is not limited in this application.

In an embodiment, the second configuration message may be one of a second SIB, a second RRC connection reconfiguration message, or a new message mechanism. That is, a communication resource pool set that is in an NR scenario is added to an original SIB or RRC connection reconfiguration field of LTE. The access network device may send the communication resource pool set to the first user terminal by using the second SIB or the second RRC connection reconfiguration message; or the access network device sends the second communication resource pool set to the first user terminal by using the new message mechanism. This is not limited in this application.

To better implement the foregoing solutions in embodiments of this application, correspondingly, the following further provides a related apparatus that is configured to implement the foregoing solutions.

Figure 9:
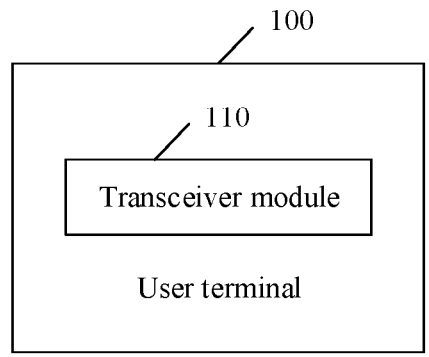
FIG. 9 is a schematic diagram of a structure of a user terminal according to an embodiment of this application.

FIG. 9 is a schematic diagram of a structure of a user terminal according to an embodiment of this application. The user terminal 100 includes a transceiver module 110.

The transceiver module 110 is configured to send a first message. The first message includes a first link configuration parameter, and the first link configuration parameter is used to establish a first link.

The transceiver module 110 is further configured to receive a first acknowledgement message sent by a second user terminal. The first acknowledgement message is used to indicate that the second user terminal completes establishment of the first link to a first user terminal.

In an embodiment, before sending the first message, the transceiver module is further configured to receive a first configuration message sent by an access network device. The first configuration message includes a first communication resource pool set, and the first communication resource pool set is used to determine the first link configuration parameter.

In an embodiment, the transceiver module 110 is further configured to: send a second message to the second user terminal through the first link, where the second message includes a second link configuration parameter, and the second link configuration parameter is used to establish a second link; receive a second acknowledgement message sent by the second user terminal, where the second acknowledgement message is used to indicate that the second user terminal completes establishment of the second link to the first user terminal; and communicate with the second user terminal through the second link.

In an embodiment, before the second message is sent to the second user terminal through the first link, the transceiver module 110 is further configured to receive a second configuration message sent by the access network device. The second configuration message includes a second communication resource pool set, and the second communication resource pool set is used to determine the second link configuration parameter.

In an embodiment, the first communication resource pool set includes a first carrier aggregation configuration. The first carrier aggregation configuration includes one or more frequency bands of a first carrier, and each frequency band of the first carrier is a licensed frequency band below 6 GHz in New Radio.

In an embodiment, the first configuration message includes one of first system information or a first radio resource control connection reconfiguration message.

In an embodiment, the second configuration message includes one of a second system information block or a second radio resource control connection reconfiguration message.

It may be understood that the transceiver module 110 in this embodiment of this application may be implemented by a transceiver or a transceiver-related circuit component.

Figure 10:
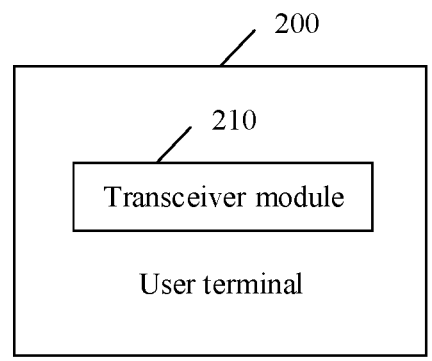
FIG. 10 is a schematic diagram of a structure of another user terminal according to an embodiment of this application.

FIG. 10 is a schematic diagram of a structure of a user terminal according to an embodiment of this application. The user terminal 200 includes a transceiver module 210.

The transceiver module 210 is configured to send a second message to a second user terminal through a first link after the first link to the second user terminal is established. The second message includes a second link configuration parameter, and the second link configuration parameter is used to establish a second link.

The transceiver module 210 is further configured to receive a second acknowledgement message sent by the second user terminal. The second acknowledgement message is used to indicate that the second user terminal completes establishment of the second link to a first user terminal.

The transceiver module 210 is further configured to communicate with the second user terminal through the second link.

In an embodiment, before sending the second message to the second user terminal through the first link, the transceiver module is further configured to receive a second configuration message sent by an access network device. The second configuration message includes a second communication resource pool set, and the second communication resource pool set is used to determine the second link configuration parameter.

In an embodiment, the transceiver module 210 is further configured to send a first message, where the first message includes a first link configuration parameter, and the first link configuration parameter is used to establish the first link; and receive a first acknowledgement message sent by the second user terminal, where the first acknowledgement message is used to indicate that the second user terminal completes establishment of the first link to the first user terminal.

In an embodiment, before sending the first message, the transceiver module 210 is further configured to receive a first configuration message sent by the access network device. The first configuration message includes a first communication resource pool set, and the first communication resource pool set is used to determine the first link configuration parameter.

In an embodiment, the first communication resource pool set includes a first carrier aggregation configuration. The first carrier aggregation configuration includes one or more frequency bands of a first carrier, and each frequency band of the first carrier is a licensed frequency band below 6 GHz in New Radio.

In an embodiment, the first configuration message includes one of first system information or a first radio resource control connection reconfiguration message.

In an embodiment, the second configuration message includes one of a second system information block or a second radio resource control connection reconfiguration message.

It may be understood that the transceiver module 210 in this embodiment of this application may be implemented by a transceiver or a transceiver-related circuit component.

Figure 11:
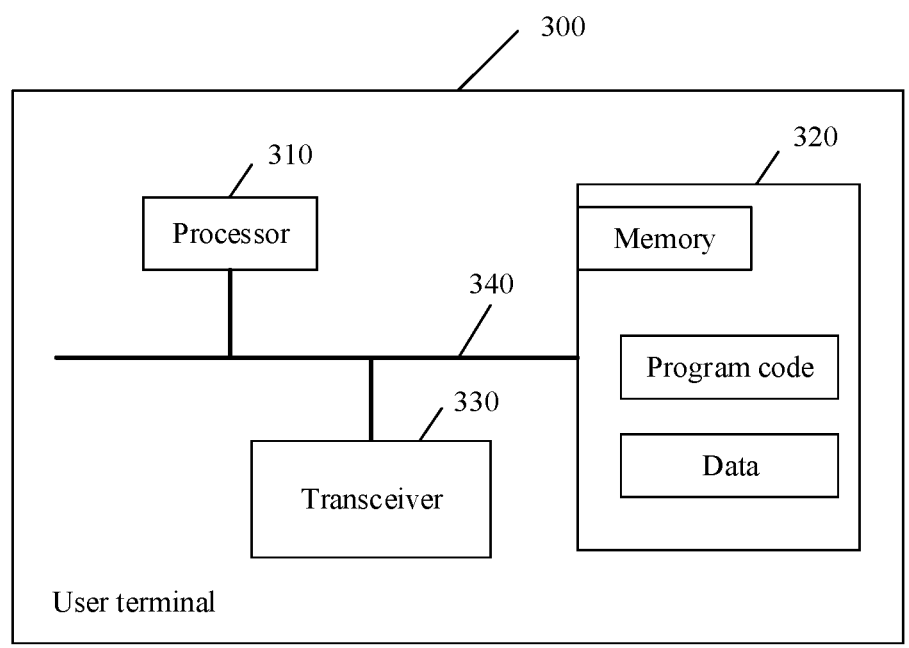
FIG. 11 is a schematic diagram of a structure of another user terminal according to an embodiment of this application.

FIG. 11 is a schematic diagram of a structure of a user terminal according to an embodiment of this application. The user terminal 300 includes a processor 310, a memory 320, and a transceiver 330. The processor 310, the memory 320, and the transceiver 330 are connected to each other by a bus 340. The memory 320 stores instructions or a program, and the processor 310 is configured to execute the instructions or the program stored in the memory 320. The transceiver 330 is configured to perform an operation performed by the transceiver module 110 or the transceiver module 210 in the foregoing embodiments.

It should be noted that the user terminal 100, the user terminal 200, or the user terminal 300 in embodiments of this application may correspond to the first user terminal in the method embodiments provided in this application. In addition, operations and/or functions of modules in the user terminal 100, the user terminal 200, or the user terminal 300 are respectively intended to implement corresponding procedures of the methods in FIG. 4, FIG. 6, FIG. 7, and FIG. 8. For brevity, details are not described herein again.

Figure 12:
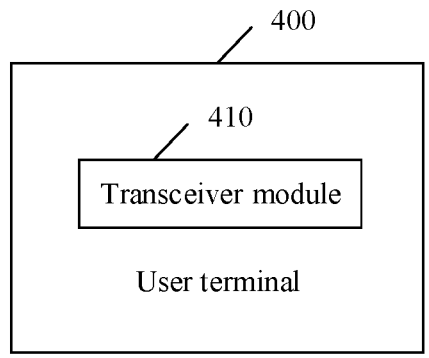
FIG. 12 is a schematic diagram of a structure of another user terminal according to an embodiment of this application.

FIG. 12 is a schematic diagram of a structure of a user terminal according to an embodiment of this application. The user terminal 400 includes a transceiver module 410.

The transceiver module 410 is configured to blindly search for a first message sent by a first user terminal. The first message includes a first link configuration parameter, and the first link configuration parameter is used to establish a first link.

The transceiver module 410 is further configured to send a first acknowledgement message to the first user terminal. The first acknowledgement message is used to indicate that a second user terminal completes establishment of the first link to the first user terminal.

In an embodiment, the transceiver module 410 is further configured to receive a second message sent by the first user terminal through the first link. The second message includes a second link configuration parameter. The second link configuration parameter is used to establish a second link; send a second acknowledgement message to the first user terminal, where the second acknowledgement message is used to indicate that the second user terminal completes establishment of the second link to the first user terminal; and communicate with the first user terminal through the second link.

It may be understood that the transceiver module 410 in this embodiment of this application may be implemented by a transceiver or a transceiver-related circuit component.

Figure 13:
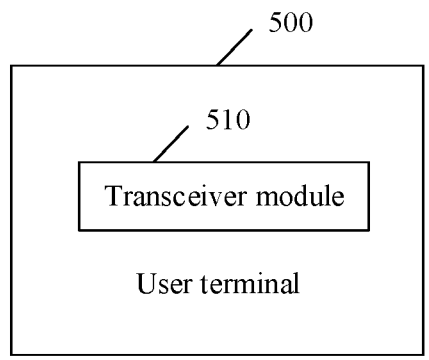
FIG. 13 is a schematic diagram of a structure of another user terminal according to an embodiment of this application.

FIG. 13 is a schematic diagram of a structure of a user terminal according to an embodiment of this application. The user terminal 500 includes a transceiver module 510.

The transceiver module 510 is configured to receive a second message sent by a first user terminal through a first link after the first link to the first user terminal is established. The second message includes a second link configuration parameter, and the second link configuration parameter is used to establish a second link.

The transceiver module 510 is further configured to send a second acknowledgement message to the first user terminal. The second acknowledgement message is used to indicate that a second user terminal completes establishment of the second link to the first user terminal.

The transceiver module 510 is further configured to communicate with the first user terminal through the second link.

In an embodiment, before receiving the second message sent by the first user terminal through the first link, the transceiver module 510 is further configured to blindly search for a first message sent by the first user terminal, where the first message includes a first link configuration parameter, and the first link configuration parameter is used to establish the first link; and send a first acknowledgement message to the first user terminal, where the first acknowledgement message is used to indicate that the second user terminal completes establishment of the first link to the first user terminal.

It may be understood that the transceiver module 510 in this embodiment of this application may be implemented by a transceiver or a transceiver-related circuit component.

Figure 14:
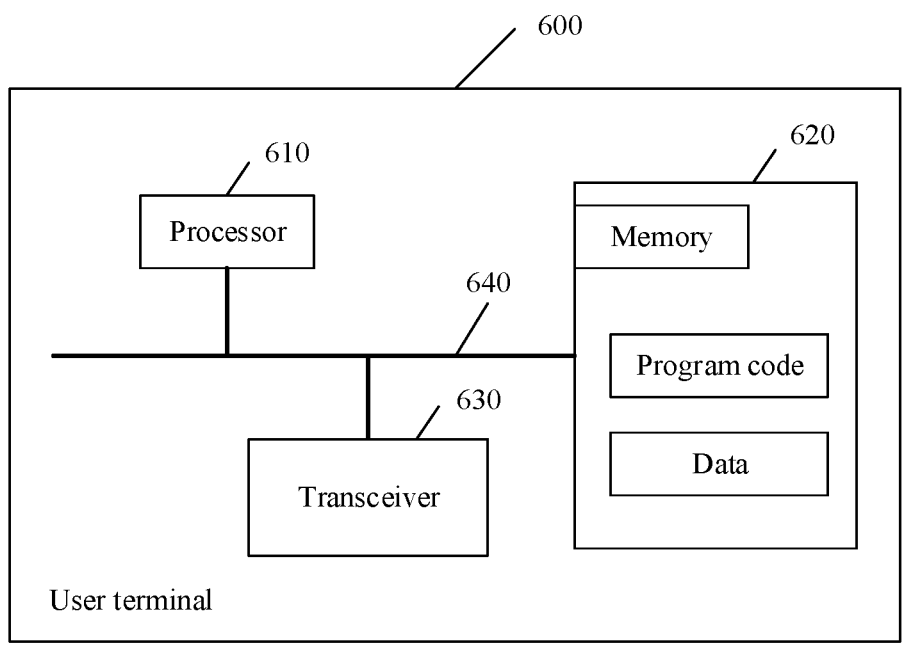
FIG. 14 is a schematic diagram of a structure of another user terminal according to an embodiment of this application.

FIG. 14 is a schematic diagram of a structure of a user terminal according to an embodiment of this application. The user terminal 600 includes a processor 610, a memory 620, and a transceiver 630. The processor 610, the memory 620, and the transceiver 630 are connected to each other by a bus 640. The memory 620 stores instructions or a program, and the processor 610 is configured to execute the instructions or the program stored in the memory 620. The transceiver 630 is configured to perform an operation performed by the transceiver module 410 or the transceiver module 510 in the foregoing embodiments.

It should be noted that the user terminal 400, the user terminal 500, or the user terminal 600 in embodiments of this application may correspond to the second user terminal in the method embodiments provided in this application. In addition, operations and/or functions of modules in the user terminal 400, the user terminal 500, or the user terminal 600 are respectively intended to implement corresponding procedures of the methods in FIG. 4, FIG. 6, FIG. 7, and FIG. 8. For brevity, details are not described herein again.

Figure 15:
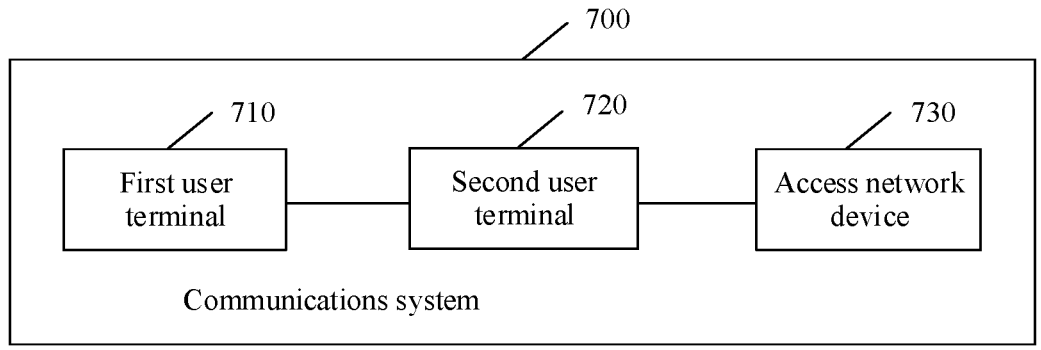
FIG. 15 is a schematic diagram of a structure of a communications system according to an embodiment of this application.

FIG. 15 is a schematic diagram of a system architecture of a communications system according to an embodiment of this application. The communications system 700 includes a first user terminal 710, a second user terminal 720, and an access network device 730.

The first user terminal 710 is configured to send a first message. The first message includes a first link configuration parameter, and the first link configuration parameter is used to establish a first link.

The second user terminal 720 is configured to blindly search for the first message.

The second user terminal 720 is further configured to send a first acknowledgement message to the first user terminal. The first acknowledgement message is used to indicate that the second user terminal completes establishment of the first link to the first user terminal.

In an embodiment, before the first message is sent by the first user terminal 710, the access network device 730 is configured to send a first configuration message to the first user terminal 710. The first configuration message includes a first communication resource pool set, and the first communication resource pool set is used to determine the first link configuration parameter.

In an embodiment, the first user terminal 710 is further configured to send a second message to the second user terminal. The second message includes a second link configuration parameter, and the second link configuration parameter is used to establish a second link.

The second user terminal 720 is further configured to send a second acknowledgement message to the first user terminal 710. The second acknowledgement message is used to indicate that the second user terminal 720 completes establishment of the second link to the first user terminal 710.

The first user terminal 710 is further configured to communicate with the second user terminal 720 through the second link.

In an embodiment, before the second message is sent by the first user terminal 710 to the second user terminal 720, the access network device 730 is further configured to send a second configuration message to the first user terminal 710. The second configuration message includes a second communication resource pool set, and the second communication resource pool set is used to determine the second link configuration parameter.

In an embodiment, the first communication resource pool set includes a first carrier aggregation configuration. The first carrier aggregation configuration includes one or more frequency bands of a first carrier, and each frequency band of the first carrier is a licensed frequency band below 6 GHz in New Radio.

In an embodiment, the first configuration message includes one of first system information or a first radio resource control connection reconfiguration message.

In an embodiment, the second configuration message includes one of second system information or a second radio resource control connection reconfiguration message.

An embodiment of this application further provides a communications apparatus, and the communications apparatus may be a user terminal or a circuit. The communications apparatus may be configured to perform an action performed by the first user terminal in the foregoing method embodiments.

Figure 16:
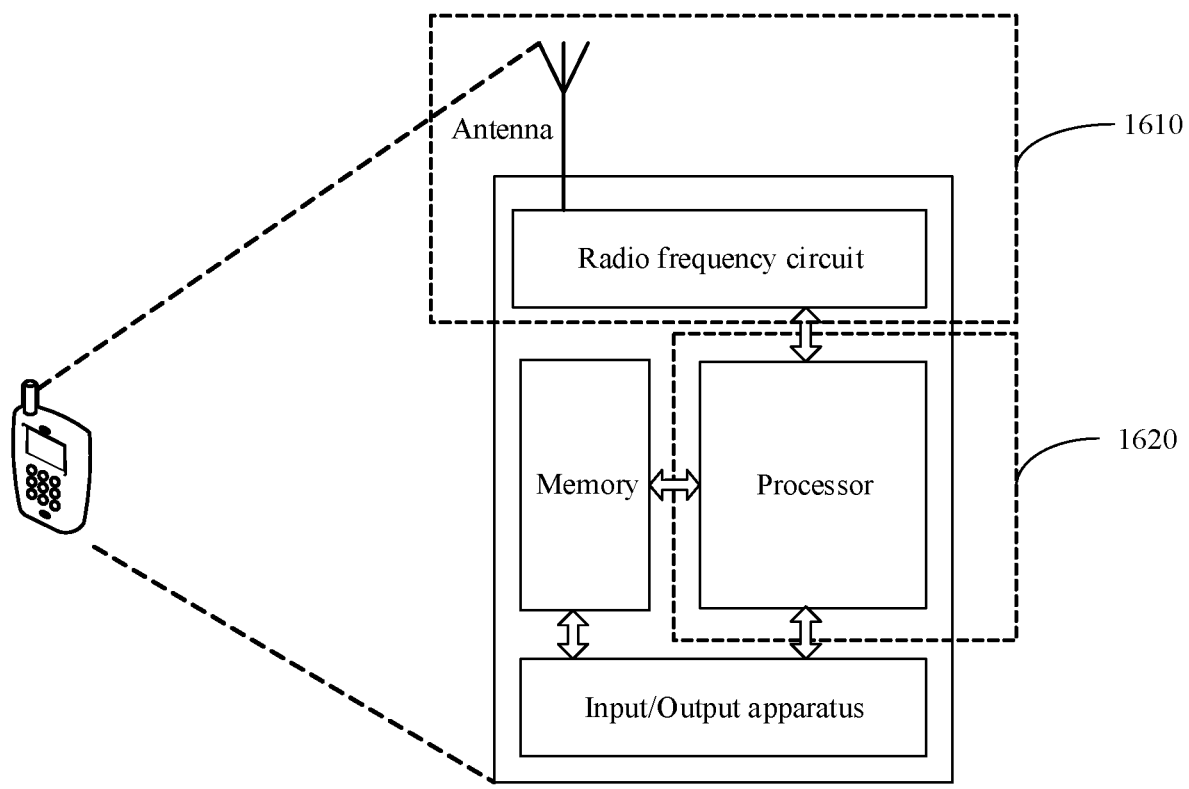
FIG. 16 is a schematic block diagram of a communications apparatus according to an embodiment of this application.

When the communications apparatus is the first user terminal or the second user terminal, FIG. 16 is a schematic diagram of a structure of a simplified user terminal. For ease of understanding and illustration, in FIG. 16, an example in which the first user terminal or the second user terminal is a mobile phone is used. As shown in FIG. 16, the user terminal includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, a keyboard, is mainly configured to receive data input by a user and output data to the user. It should be noted that some types of user terminals may not have an input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into the baseband signal, and outputs the baseband signal to the processor. The processor converts the baseband signal into data and processes the data. For ease of description, only one memory and one processor are shown in FIG. 16. In an actual user terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna having a transceiver function and the radio frequency circuit may be considered as a transceiver unit of the user terminal, and the processor having a processing function may be considered as a processing unit of the user terminal. As shown in FIG. 16, the first user terminal or the second user terminal includes the transceiver unit 1610 and the processing unit 1620. The transceiver unit may also be referred to as a transceiver, a transceiver machine, a transceiver apparatus, or the like. The processing unit may also be referred to as a processor, a processing board, a processing module, a processing apparatus, or the like. Optionally, in the transceiver unit 1610, a component configured to implement a receiving function may be considered as a receiving unit; and in the transceiver unit 1610, a component configured to implement a sending function may be considered as a sending unit. That is, the transceiver unit 1610 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit may also be sometimes referred to as a transmitter machine, a transmitter, a transmitting circuit, or the like.

It should be understood that the transceiver unit 1610 is configured to perform the sending operation and the receiving operation on a user terminal side in the foregoing method embodiments, and the processing unit 1620 is configured to perform an operation other than the receiving operation and the sending operation of the user terminal in the foregoing method embodiments.

For example, in an implementation, the transceiver unit 1610 is configured to perform a receiving operation and a sending operation on the first user terminal side in related operations in FIG. 4, FIG. 6, FIG. 7, and FIG. 8, and/or the transceiver unit 1610 is further configured to perform another receiving operation and another sending operation on the first user terminal side in embodiments of this application.

When the communications apparatus is a chip, the chip includes a transceiver unit and a processing unit. The transceiver unit may be an input/output circuit or a communication interface. The processing unit is a processor, a microprocessor, or an integrated circuit integrated on the chip.

Figure 17:
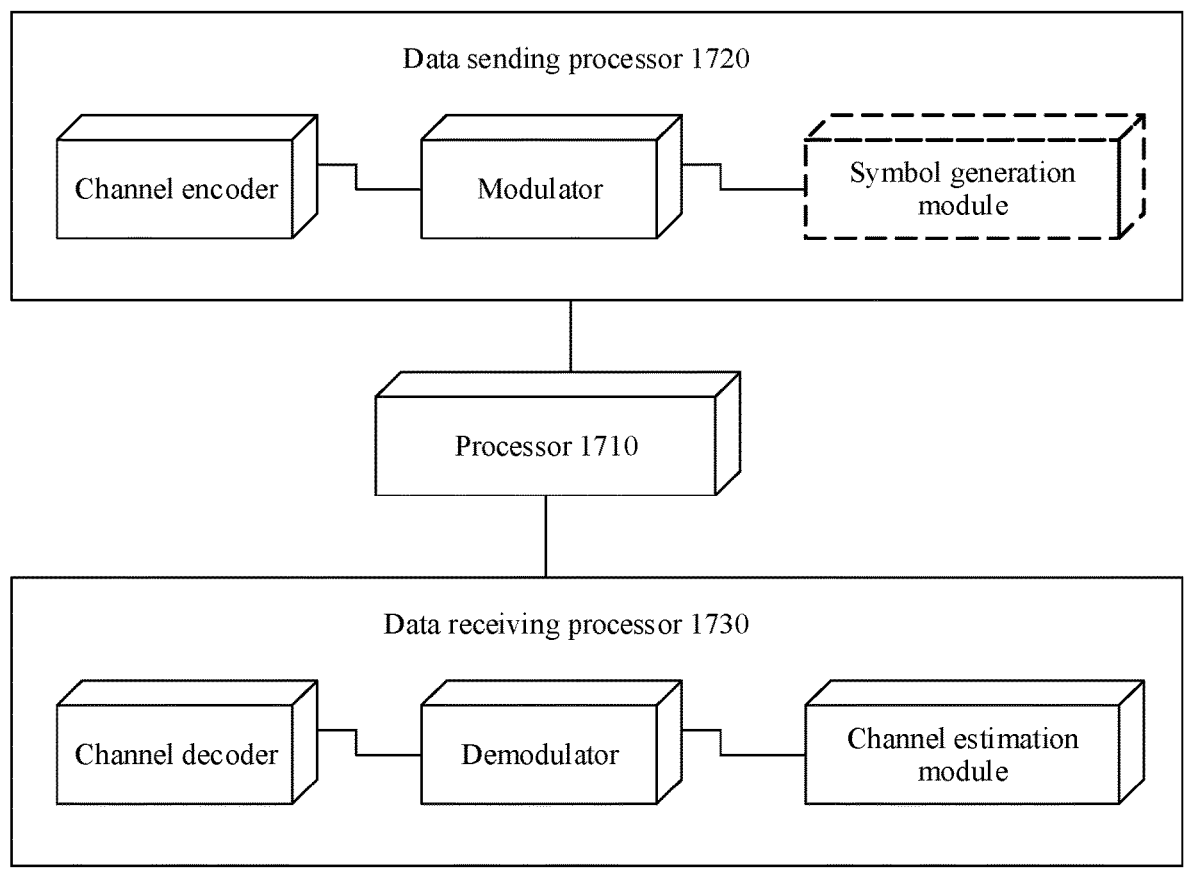
FIG. 17 is another schematic block diagram of a communications apparatus according to an embodiment of this application.

When the communications apparatus in this embodiment is the user terminal, refer to a device shown in FIG. 17. In an example, the device may implement a function similar to that of the processor in FIG. 11 or FIG. 14. In FIG. 17, the device includes a processor 1710, a data sending processor 1720, and a data receiving processor 1730. The processing module in the foregoing embodiment may be the processor 1710 in FIG. 17, and completes a corresponding function. The transceiver module in the foregoing embodiment may be the data sending processor 1720 and/or the data receiving processor 1730 in FIG. 17. Although a channel encoder and a channel decoder are shown in FIG. 17, it may be understood that these modules are not intended to constitute limitative description of this embodiment and are merely examples.

Figure 18:
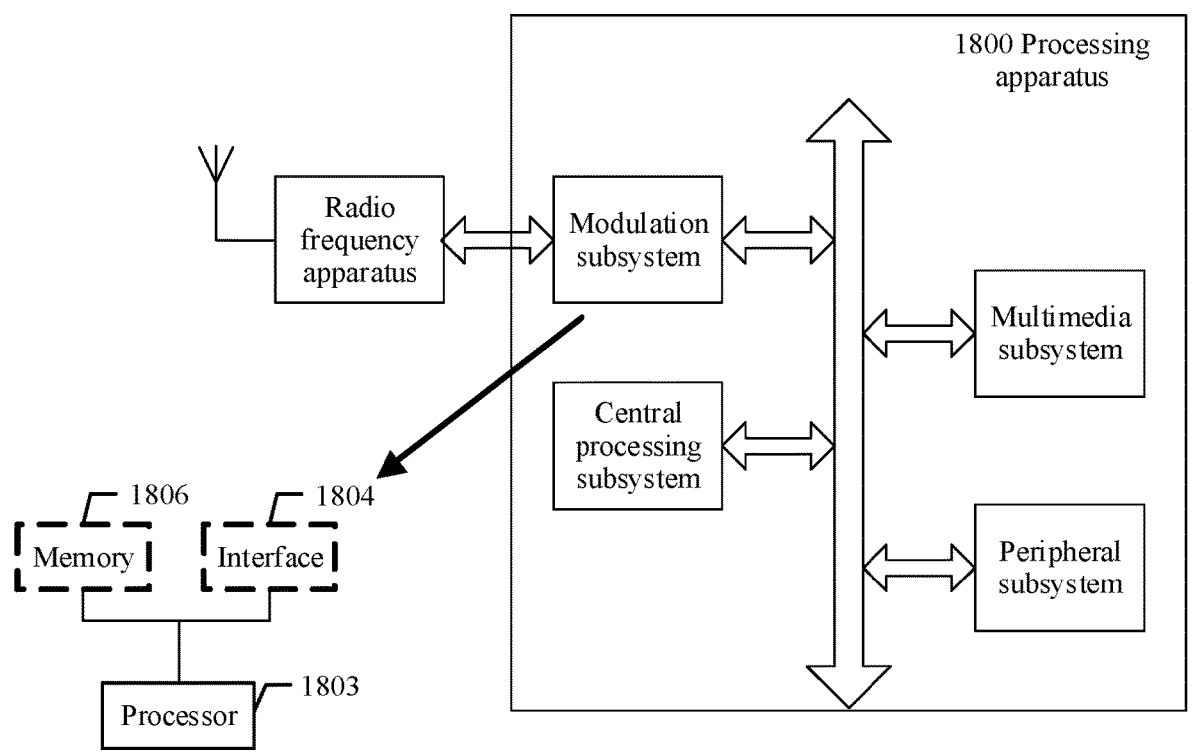
FIG. 18 is yet another schematic block diagram of a processing apparatus according to an embodiment of this application.

FIG. 18 shows a form of the processing apparatus in this embodiment. The processing apparatus 1800 includes modules such as a modulation subsystem, a central processing subsystem, and a peripheral subsystem. The communications apparatus in this embodiment may be used as the modulation subsystem thereof. Specifically, the modulation subsystem may include a processor 1803 and an interface 1804. The processor 1803 completes a function of the foregoing processing module, and the interface 1804 completes a function of the foregoing transceiver module. In another variant, the modulation subsystem includes a memory 1806, the processor 1803, and a program that is stored in the memory 1806 and that can run on the processor. When executing the program, the processor 1803 implements the method on the user terminal side in the foregoing method embodiments. It should be noted that the memory 1806 may be nonvolatile or volatile. The memory 1806 may be located in the modulation subsystem, or may be located in the processing apparatus 1800, provided that the memory 1806 can connect to the processor 1803.

An embodiment of this application further provides a computer-readable storage medium that stores a computer program. When the program is executed by a processor, a procedure that is of the communication method provided in the foregoing method embodiments and that is related to the first user terminal or the second user terminal can be implemented.

An embodiment of this application further provides a computer program product. When the computer program product is run on a computer or a processor, the computer or the processor is enabled to perform one or more operations in any one of the foregoing communication methods. When each component module in the foregoing related device is implemented in a form of a software functional unit and sold or used as an independent product, the module may be stored in the computer-readable storage medium.

It should be understood that, the processor mentioned in embodiments of this application may be a central processing unit (CPU), may further be another general-purpose processor, a digital signal processor (DSP), an application specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification aims to include but is not limited to these memories and any memory of another appropriate type.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief descriptions, for detailed working processes of the foregoing systems, apparatuses, and units, refer to corresponding processes in the foregoing method embodiments. Details are not described herein again.

In several embodiments provided in this application, it should be understood that the disclosed system, apparatus, and method may be implemented in another manner. For example, the described apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional art, or some of the technical solutions may be implemented in a form of a software product. The computer software product is stored in a storage medium, and includes several instructions for indicating a computer device (which may be a personal computer, a server, or a network device) to perform all or some of operations of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

A sequence of the operations of the methods in embodiments of this application may be adjusted, combined, and deleted based on actual requirements.

The modules in the apparatus in embodiments of this application may be combined, divided, and deleted based on actual requirements.

The foregoing embodiments are merely intended to describe the technical solutions of this application, but are not to limit this application. Although this application is described in detail with reference to the foregoing embodiments, a person of ordinary skill in the art should understand that modifications may still be made to the technical solutions recorded in the foregoing embodiments or equivalent replacements may be made to some technical features thereof without departing from the scope of the technical solutions of embodiments of this application.

What is claimed is:

1. A communication method performed by a first user terminal, comprising:
   determining a first communication resource pool set specifying a plurality of first communication resource pools, wherein the first communication resource pool set is used to determine a first link configuration parameter;
   sending a first message using the first communication resource pool set, wherein the first message comprises the first link configuration parameter, and the first link configuration parameter is used to establish a first link;
   receiving a first acknowledgement message sent by a second user terminal, wherein the first acknowledgement message is used to indicate that the second user terminal completes establishment of the first link to the first user terminal;
   sending a second message to the second user terminal through the first link, wherein the second message comprises a second link configuration parameter, and the second link configuration parameter is used to establish a second link;
   receiving a second acknowledgement message sent by the second user terminal, wherein the second acknowledgement message is used to indicate that the second user terminal completes establishment of the second link to the first user terminal; and
   communicating with the second user terminal through the second link,
   wherein the first link is a link different than the second link.

2. The method according to claim 1, wherein before the sending the first message, the method further comprises:
   receiving a first configuration message sent by an access network device, wherein the first configuration message comprises the first communication resource pool set.

3. The method according to claim 2, wherein the first configuration message comprises one of first system information or a first radio resource control connection reconfiguration message.

4. The method according to claim 1, wherein before the sending the second message to the second user terminal through the first link, the method further comprises:
   receiving a second configuration message sent by an access network device, wherein the second configuration message comprises a second communication resource pool set, and the second communication resource pool set is used to determine the second link configuration parameter.

5. The method according to claim 4, wherein the second configuration message comprises one of a second system information or a second radio resource control connection reconfiguration message.

6. The method according to claim 1, wherein the first communication resource pool set comprises a first carrier aggregation configuration, the first carrier aggregation configuration comprises one or more frequency bands of a first carrier, and each frequency band of the first carrier is a licensed frequency band below 6 GHz in New Radio.

7. A communication method performed by a second user terminal, comprising:
   blindly searching for a first message sent by a first user terminal, wherein the first message comprises a first link configuration parameter, and the first link configuration parameter is used to establish a first link, wherein the first message is received at one of a plurality of first communication resource pools specified by a first communication resource pool set and the first communication resource pool set is used to determine the first link configuration parameter;
   sending a first acknowledgement message to the first user terminal, wherein the first acknowledgement message is used to indicate that the second user terminal completes establishment of the first link to the first user terminal;
   receiving a second message sent by the first user terminal through the first link, wherein the second message comprises a second link configuration parameter, and the second link configuration parameter is used to establish a second link;
   sending a second acknowledgement message to the first user terminal, wherein the second acknowledgement message is used to indicate that the second user terminal completes establishment of the second link to the first user terminal; and
   communicating with the first user terminal through the second link,
   wherein the first link is a link different than the second link.

8. A communication method performed in a communications system that comprises a first user terminal, a second user terminal, and an access network device, wherein the method comprises:
   determining, by the first user terminal, a first communication resource pool set specifying a plurality of first communication resource pools, wherein the first communication resource pool set is used to determine a first link configuration parameter;
   sending, by the first user terminal, a first message using the first communication resource pool set, wherein the first message comprises the first link configuration parameter, and the first link configuration parameter is used to establish a first link;
   blindly searching, by the second user terminal, for the first message;
   sending, by the second user terminal, a first acknowledgement message to the first user terminal, wherein the first acknowledgement message is used to indicate that the second user terminal completes establishment of the first link to the first user terminal;
   sending, by the first user terminal, a second message to the second user terminal, wherein the second message comprises a second link configuration parameter, and the second link configuration parameter is used to establish a second link;
   sending, by the second user terminal, a second acknowledgement message to the first user terminal, wherein the second acknowledgement message is used to indicate that the second user terminal completes establishment of the second link to the first user terminal; and
   communicating, by the first user terminal, with the second user terminal through the second link,
   wherein the first link is a link different than the second link.

9. The method according to claim 8, wherein before the sending, by the first user terminal, the first message, the method further comprises:
   sending, by the access network device, a first configuration message to the first user terminal, wherein the first configuration message comprises the first communication resource pool set.

10. The method according to claim 9, wherein the first communication resource pool set comprises a first carrier aggregation configuration, the first carrier aggregation configuration comprises one or more frequency bands of a first carrier, and each frequency band of the first carrier is a licensed frequency band below 6 GHz in New Radio.

11. The method according to claim 9, wherein the first configuration message comprises one of first system information or a first radio resource control connection reconfiguration message.

12. The method according to claim 8, wherein before the sending, by the first user terminal, the second message to the second user terminal, the method further comprises:
   sending, by the access network device, a second configuration message to the first user terminal, wherein the second configuration message comprises a second communication resource pool set, and the second communication resource pool set is used to determine the second link configuration parameter.

13. The method according to claim 12, wherein the second configuration message comprises one of second system information or a second radio resource control connection reconfiguration message.

\* \* \* \* \*